US006910967B2

(12) United States Patent
Yamaguchi

(10) Patent No.: US 6,910,967 B2
(45) Date of Patent: Jun. 28, 2005

(54) NETWORK PARTICIPATION TYPE GAME SYSTEM, COMPUTER READABLE RECORDING MEDIUM STORING PROGRAM OF SYSTEM, AND PROGRAM TO BE USED IN GAME SYSTEM

(75) Inventor: Takashi Yamaguchi, Tokyo (JP)

(73) Assignee: Konami Corporation, Tokyo (JP)

( * ) Notice: Subject to any disclaimer, the term of this patent is extended or adjusted under 35 U.S.C. 154(b) by 275 days.

(21) Appl. No.: 09/956,545

(22) Filed: Sep. 18, 2001

(65) Prior Publication Data
US 2002/0059252 A1 May 16, 2002

(30) Foreign Application Priority Data

Sep. 19, 2000 (JP) ........................................ 2000-283877
Mar. 14, 2001 (JP) ........................................ 2001-073194

(51) Int. Cl.[7] .................................................. A63F 9/24
(52) U.S. Cl. ....................... 463/42; 345/473; 715/500.1
(58) Field of Search ................................. 463/40–42, 1, 463/9, 7; 273/460; 345/716–717, 473, 629, 634; 700/91; 715/700, 731, 500, 500.01

(56) References Cited

U.S. PATENT DOCUMENTS

| 4,305,131 A | * | 12/1981 | Best .............................. 463/35 |
| 5,267,734 A | * | 12/1993 | Stamper et al. ................ 463/23 |
| 5,604,855 A | * | 2/1997 | Crawford ..................... 345/473 |
| 5,659,793 A | * | 8/1997 | Escobar et al. ......... 715/500.01 |
| 6,222,925 B1 | * | 4/2001 | Shiels et al. ................. 380/211 |
| 6,343,990 B1 | * | 2/2002 | Rasmussen et al. .......... 463/25 |
| 6,669,564 B1 | * | 12/2003 | Young et al. .................. 463/42 |

FOREIGN PATENT DOCUMENTS

WO  WO 97/08891  3/1997

OTHER PUBLICATIONS

It's good to be King [www.cnn.com/2000/books/news/07/25/king.cnn/l], by Bill Delaney CNN.com, pps1–3.*
Dengeki "yarudora" project ScandalNET Published Jun. 23, 2000, 6th vol. No. 16, p. 146.
Dengeki "yarudora" project ScandalNET Published Jul. 7, 2000, 6th vol. No. 18, p. 192.

* cited by examiner

Primary Examiner—Mark Sager
(74) Attorney, Agent, or Firm—Jordan and Hamburg LLP

(57) ABSTRACT

A network participation type game system for distributing a game from a game provider to a member via a network comprises a device for sequentially and regularly distributing a segment story from the game provider to the member, said segment story being prepared by segmenting a story constituting the game, said segment story being provided on a member dedicated page provided with a plurality of selection buttons, and the selection buttons being capable of selecting a changeable manner of a character or the like in the segment story; and a device for transmitting member's intention to the game provider in accordance with selection of the selection buttons by the member; wherein the game provider is allowed to change manners of the character or the like of next and after segment stories with reflecting the transmitted member's intention.

18 Claims, 21 Drawing Sheets

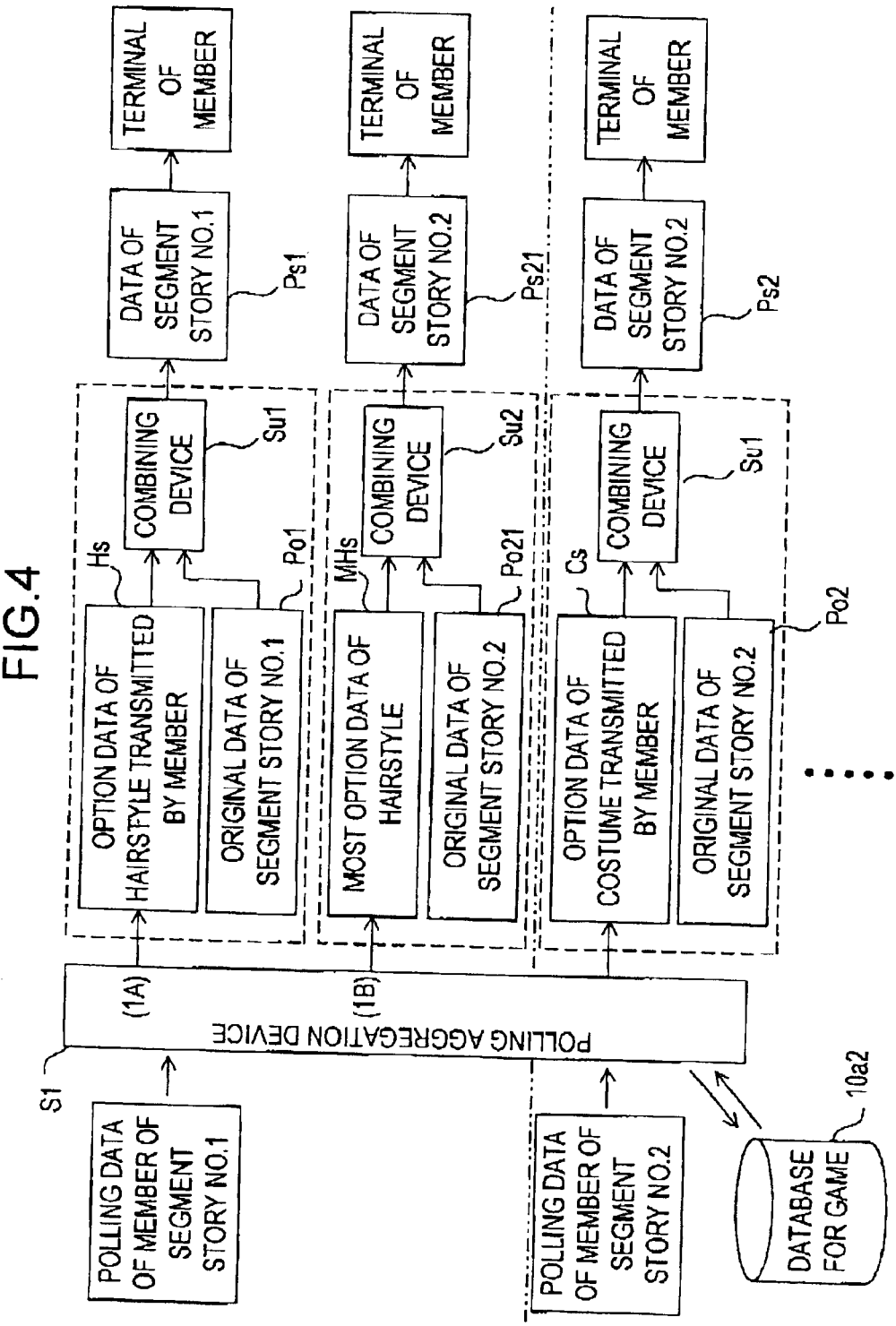

FIG.17

|          | ITEM          | NAME   | BACK GROUND  | ADDITIONAL POINT |
|----------|---------------|--------|--------------|------------------|
| SCENARIO M | BASIC COSTUME | GUMI   | HER ROOM     |                  |
| OPTION Ma | LEOTARD       | GUMI   | HER ROOM     | 50               |
| OPTION Mb | BASIC COSTUME | GUMI   | GAME ARCADE  | 40               |
| OPTION Mc | GYM SUIT      | LAMUNE | GAME ARCADE  | 30               |
| OPTION Md | BASIC COSTUME | LAMUNE | KARAOKE SHOP | 20               |
| OPTION Me | COW GIRL      | LAMUNE | KARAOKE SHOP | 10               |

NETWORK PARTICIPATION TYPE GAME SYSTEM, COMPUTER READABLE RECORDING MEDIUM STORING PROGRAM OF SYSTEM, AND PROGRAM TO BE USED IN GAME SYSTEM

BACKGROUND OF THE INVENTION

1. Field of the Invention

The present invention relates to a game system via a network. More specifically, the present invention relates to a network participation type game system, which is connected via a network such as the Internet or the like and is played by many participants, and a recording medium readable by a computer, in which a program of the system is recorded.

2. Description of the Related Art

Conventionally, upon playing a game by the use of a personal computer, the game is played by a game software, which is installed in this personal computer itself or the game is played by use of a game software, which is provided by a host computer via the Internet.

Particularly, in recent years, a latter manner has been rapidly popular, since the Internet has been rapidly popular to be used for collecting the information and exchanging the Internet or the like so that large number of people can participate in the game via the Internet.

In the case of playing the game via the Internet, having access to a WWW (WORLD WIDE WEB) server for a game, a player plays a game executed by a game software, which is stored in this server.

As these various games, there are a game to be played in accordance with a rule, which is set in advance by use of a card, a character and an item or the like and a competitive game such that unknown persons compete with each other as a game that a plurality of persons participate in or the like.

In the mean time, a communication rate for current data transmission is 56 kbps (kilo bit per second) and it is attenuated to 44 kbps after it passed through a gate. The data transmission rate is scheduled to be 300 kbps soon and a base in order that a new multimedia type game is capable of being played via a network has been fixed up in cooperation with progress of an image processing technology.

However, the above described game played by a game software, which is installed in this personal computer itself, made progress as determined by a game provider, so that it was obliged to be monotonous.

Alternatively, in the same way, the above described game by use of a card, a character and an item or the like or the above described competitive game that a plurality of persons participate in made progress as determined by a game provider and it was obliged to be monotonous. Further, the intentions of the players were not reflected on the game.

SUMMARY OF THE INVENTION

The present invention has been made taking the present problems into consideration, an object of which is to provide a network participation type game system in which large number of people can participate via a network, which is enjoyable and beneficial for the game participants and in which the game participants enable large number of people to participate and a recording medium readable by a computer, in which a program of the system is recorded.

In order to attain the above described object, in the first aspect of the present invention, there is provided a network participation type game system for distributing a game from a game provider to a member via a network, said game system comprising: a device for sequentially and regularly distributing a segment story from the game provider to the member, said segment story being prepared by segmenting a story constituting the game, said segment story being provided on a member dedicated page provided with a plurality of selection buttons, and the selection buttons being capable of selecting a changeable manner of a character or the like in the segment story; and a device for transmitting member's intention to the game provider in accordance with selection of the selection buttons by the member; wherein the game provider is allowed to change manners of the character or the like of next and after segment stories with reflecting the transmitted member's intention.

In the game system according to the first aspect of the present invention, the selection buttons may include at least a specific selection button, and a predetermined amount of money may be collected from the member by the game provider as well as the member's intention to the game provider is transmitted to the game provider through the selection of the specific selection button. The member's intention to be reflected on the next and after segment stories may correspond to the intention of the most members. When the member's intention is identical with the intention of the most members, a point may be given to the member and the members may compete for their points. The members' intentions may be aggregated with being accumulated in plural times for each segment story, and odds for the point to be given to the member may be lower for the later aggregation of the members' intentions. The point may be different between the segment stories. The point to be given to the member may be set to be higher in a later segment story than in a former segment story. The network participation type game system may create a picture and a voice by combining or assembling pictures and voices selected from the respective segment stories, and may provide said picture and voice so as to be published to thereby be freely caught on a Web site.

In the second aspect of the present invention, there is provided a network participation type game system comprising: a device for sequentially and regularly distributing a segment story via a network from a game provider to a member, said segment story being prepared by segmenting a story constituting a game; and a device for creating a picture and a voice by combining or assembling pictures and voices selected from the respective segment stories and for providing said picture and voice so as to be published to thereby be freely caught on a Web site.

In the third aspect of the present invention, there is provided a recording medium readable by a computer, said recording medium being associated with a network participation type game system in which a story constituting a game is segmented to be sequentially distributed from a game provider to a member as a segment story via a network, a member selects a selection item of a manner such as the character or the like from the selection items of changeable manner of a character or the like to be given to the member in the segment story and transmits the member's intention to the game provider, and the next and after segment stories in which the game provider reflects the intention of the most members to change the manners of the character or the like are distributed by the game provider, said recording medium storing, in a movie file format, the distributed segment stories, in which all selection items for changing the manners of the character or the like are capable of being selected.

In the fourth aspect of the present invention, there is provided a recording medium readable by a computer, said recoding medium being associated with a network participation type game system in which a story constituting a game is segmented to be sequentially distributed from a game provider to a member as a segment story via a network, a member selects a selection item of a manner such as the character or the like from the selection items of changeable manner of a character or the like to be given to the member in the segment story and transmits the member's intention to the game provider, and the next and after segment stories in which the game provider reflects the intention of the most members to change the manners of the character or the like are distributed by the game provider, said recording medium storing, in a movie file format, all stories sequentially integrating the distributed segment stories, in which all selection items for changing the manners of the character or the like are capable of being selected.

In the fifth aspect of the present invention, there is provided a recording medium readable by a computer in which a program of a network participation type game system for distributing a game from a game provider to a member via a network is recorded, said program being configured to allow the computer system to serve as: a device for sequentially and regularly distributing a segment story from the game provider to the member, said segment story being prepared by segmenting a story constituting the game, said segment story being provided on a member dedicated page provided with a plurality of selection buttons, and the selection buttons being capable of selecting a changeable manner of a character or the like in the segment story; and a device for transmitting member's intention to the game provider in accordance with selection of the selection buttons by the member; wherein the game provider is allowed to change manners of the character or the like of next and after segment stories with reflecting the transmitted member's intention.

In the recording medium according to the fifth aspect of the present invention, the selection buttons may include at least a specific selection button, and a predetermined amount of money may be collected from the member by the game provider as well as the member's intention to the game provider is transmitted to the game provider through the selection of the specific selection button. The member's intention to be reflected on the next and after segment stories may comprise the intention of the most members. When the member's intention is identical with the intention of the most members, a point may be given to the member and the members compete for their points. The members' intentions may be aggregated with being accumulated in plural times for each segment story, and odds for the point to be given to the member may be lower for the later aggregation of the members' intentions. The point may be different between the segment stories. The point to be given to the member may be set to be higher in a later segment story than in a former segment story. The network participation type game system may create a picture and a voice by combining or assembling pictures and voices selected from the respective segment stories, and may provide said picture and voice so as to be published to thereby be freely caught on a Web site.

In the sixth aspect of the present invention, there is provided a recording medium readable by a computer, in which a program of a network participation type game system is recorded, said program being configured to allow the computer to serve as: a device for sequentially and regularly distributing a segment story via a network from a game provider to a member, said segment story being prepared by segmenting a story constituting a game; and a device for creating a picture and a voice by combining or assembling pictures and voices selected from the respective segment stories and for providing said picture and voice so as to be published to thereby be freely caught on a Web site.

In the seventh aspect of the present invention, there is provided a network participation type game system comprising a game server and a terminal of a user, said game server being connected with the terminal via a predetermined network and a game being advanced through bi-directional transmission of information; wherein the game server sequentially and regularly distributes play information to the terminal to play, on the terminal, a segment story constituted so as to be recognized by the user as a portion of a series of stories of the game and so as to give to the user an opportunity to select any option from a plurality of options; the terminal transmits selection information for specifying which option the user selects among said plurality of options, which are prepared for the segment story, to the game server; and the game server changes a content of other segment story to be distributed later than a specified segment story on the basis of selection results of respective users with respect to the options, which are prepared for the specified segment story. According to this game system, in response to the selection result of the user, the story of the game is changed, so that the user can enjoy the feeling such that he or she influences the change of the story of the game, so that the game becomes more interesting.

In the games system according to the seventh aspect of the present invention, the game server controls distribution of the play information so that a latest segment story is updated every when a predetermined publication unit time period passes over and the user is also allowed to obtain the play information associated with the segment story previous to the latest segment story depending on a user's desire. In this case, even the person who participates in the game behind time can refer to the passed stories, so that the user can easily participate in the game from the middle of the game and a larger number of people can enjoy the game.

In the seventh aspect, the game server may decide a content of a segment story to be distributed as the latest segment story in a next publication unit time period on the basis of the selection information, which is accepted with respect to a present segment story, until the publication unit time period with respect to the present segment story passes over. According to this invention, a content of the next segment story is decided on the basis of the selection information, which is transmitted during the publication unit time period of the latest segment story, so that it is possible to attract the user's interest by quickening the progress of the story.

The game server may accept the selection information relevant to the same segment story across a predetermined accepting time period even after the publication unit time period with respect to the latest segment story passes over and with respect to at least the selection information, which are accepted during the accepting time period, the game server may give the point in association with this selection content to the user. In this case, even the user who participates in the game from the middle of the game can select the options, which are prepared for the past stories and a point is given to this user in association with this selection, so that he or she is capable of adequately enjoying the game.

In the case that the user performs a predetermined accounting object operation with respect to the plurality of options, respectively, the game server may generate accounting information with respect to this accounting object operation. In this case, it is possible to set account to a plurality of options, respectively, so that it becomes possible to easily adjust fairness or surprise with respect to the accounting.

The information, which is distributed from the game server to the terminal, may include information for displaying, on the terminal, pictures associated with the plurality of options, respectively, and operation, which is performed on the terminal in order for that the user desires to catch each of the pictures associated with the plurality of options, respectively, may be set as the accounting object operation. In this case, the user is charged every when he or she watches a picture in association with respective option. The picture in association with respective option may display a content of the option or it may express clearly the influence to be given to the story by the option or it may suggest this. For example, when the item which the character puts on is prepared as the option, it is possible to display the manner that the character puts on this item by a static image or a moving image.

The game server may generate the accounting information of the same amount of money for the accounting object operation with respect to each of options prepared for the same segment stories, and, in the case that the user transmits the selection information, a point, which is differentiated in response to the options, is given to the user. In this case, even if the account is the same amount with respect to respective options, the given points are differentiated and the fun as the game is increased.

The game server may select one segment story as the other segment story from a plurality of segment story candidates, which are different each other and are prepared in advance, on the basis of the selection information, and may distribute the play information associated with this selected segment story, so that the game server changes the content of the other segment story. In this case, the corresponding relation between the option and the next and after segment stories, which are associated with this option, can be set in advance, so that the processing burden of the server is decreased.

The game server tentatively may close accepting of the selection information with respect to the options, which are associated with the present segment story, at a time when the publication unit time period with respect to the present segment story passes over; the game server may suppose a content of the segment story to be distributed as a latest segment story during a next publication unit time period on the basis of the selection information until the publication unit time period with respect to the present segment story, while accepting the selection information with respect to the same segment story across a predetermined time period even after this publication unit time period passes over; and the game server may decide a content of the supposed segment story with reflecting the selection information, which is accepted during said predetermined time period. In this case, it is possible to change a content of the segment story after the fact, so that surprising is increased.

In the eighth aspect of the present invention, there is provided a program for a server, which is used in a network participation type game system for connecting a game server with a terminal of a user via a predetermined network and advancing a game through bi-directional transmission of information; said program being configured to allow the game server to perform processing of: sequentially and regularly distributing play information to the terminal to play on the terminal a segment story constituted so as to be recognized by the user as a portion of a series of stories of the game and so as to give an opportunity to select any option from a plurality of options to the user; obtaining selection information for specifying which option the user selects among said plurality of options, which are prepared for the segment story, to the game server; and changing a content of other segment story to be distributed later than a specified segment story on the basis of selection results of respective users with respect to the options, which are prepared for the specified segment story.

The program may be structured so as to make the game server operate as a device for controlling distribution of the play information so that the latest segment story is updated every when a predetermined publication unit time period passes over and the user is also allowed to obtain the play information associated with the segment story previous to the latest segment story depending on a user's desire.

The program may be structured so as to make the game server perform processing for deciding a content of a segment story to be distributed as the latest segment story in a next publication unit time period on the basis of the selection information, which is accepted with respect to a present segment story, until the publication unit time period with respect to the latest segment story passes over.

The program may be structured so as to make the game server perform processing for: accepting the selection information relevant to the same segment story across a predetermined accepting time period even after the publication unit time period with respect to the latest segment story passes over and with respect to at least the selection information, which are accepted during the accepting time period; and giving the point in association with this selection content to the user.

The program may be structured so as to make the game server perform processing for, in the case that the user performs a predetermined accounting object operation with respect to the plurality of options, respectively, generating accounting information with respect to this accounting object operation.

In the above program, the information, which is distributed from the game server to the terminal, may include information for displaying, on the terminal, pictures associated with the plurality of options, respectively; and operation, which is performed on the terminal in order for that the user desires to catch each of the pictures associated with the plurality of options, respectively, may be set as the accounting object operation.

The program may be structured so as to make the game server perform processing for: generating the accounting information of the same amount of money for the accounting object operation with respect to each of options prepared for the same segment stories; and in the case that the user transmits the selection information, giving to the user a point, which is differentiated in response to the options.

The program may be structured so as to make the game server perform processing for: selecting one segment story as the other segment story from a plurality of segment story candidates, which are different each other and are prepared in advance, on the basis of the selection information; and distributing the play information associated with this selected segment story.

The program may be structured so as to make the game server perform processing for: tentatively closing accepting of the selection information with respect to the options, which are associated with the present segment story, at a time when the publication unit time period with respect to the present segment story passes over; supposing a content of the segment story to be distributed as a latest segment story during a next publication unit time period on the basis of the selection information until the publication unit time period with respect to the present segment story, while accepting the selection information with respect to the same segment story across a predetermined time period even after this publication unit time period passes over; and deciding a content of the supposed segment story with reflecting the selection information, which is accepted during said predetermined time period.

According to the present invention, a member may be limited to a person who is registered in a server or the like in advance or may not be limited. In the case that a member is not needed to be registered in the server or the like in advance, as a requirement upon transmitting the intention, a member registration may be required. Alternatively, a concept of a user may not be limited to a member. Selection buttons provided on a member dedicated page may be recognized as a portion to be virtually operated when the user selects something on so called Web page and they may not be limited to a shape of a button. For example, a shape such as a check box may represent a selection button. According to the present invention, the user preferably recognizes a segment story as a portion of a series of a story. According to the change in a content of the segment story, the story's progression itself may be changed or the characters appear on the story may be changed in any way. In either case, a person who watches the segment story may identify the any change depending on respective users' or members' selection result.

BRIEF DESCRIPTION OF THE DRAWINGS

FIG. 4 is a diagram for illustrating a system processing according to the first embodiment of the present invention;

FIG. 17 is a diagram for illustrating an example of information, which is determined in advance for every option.

DESCRIPTION OF THE PREFERRED EMBODIMENTS

The present invention will be explained in detail with reference to the drawings below.

Figure 1:
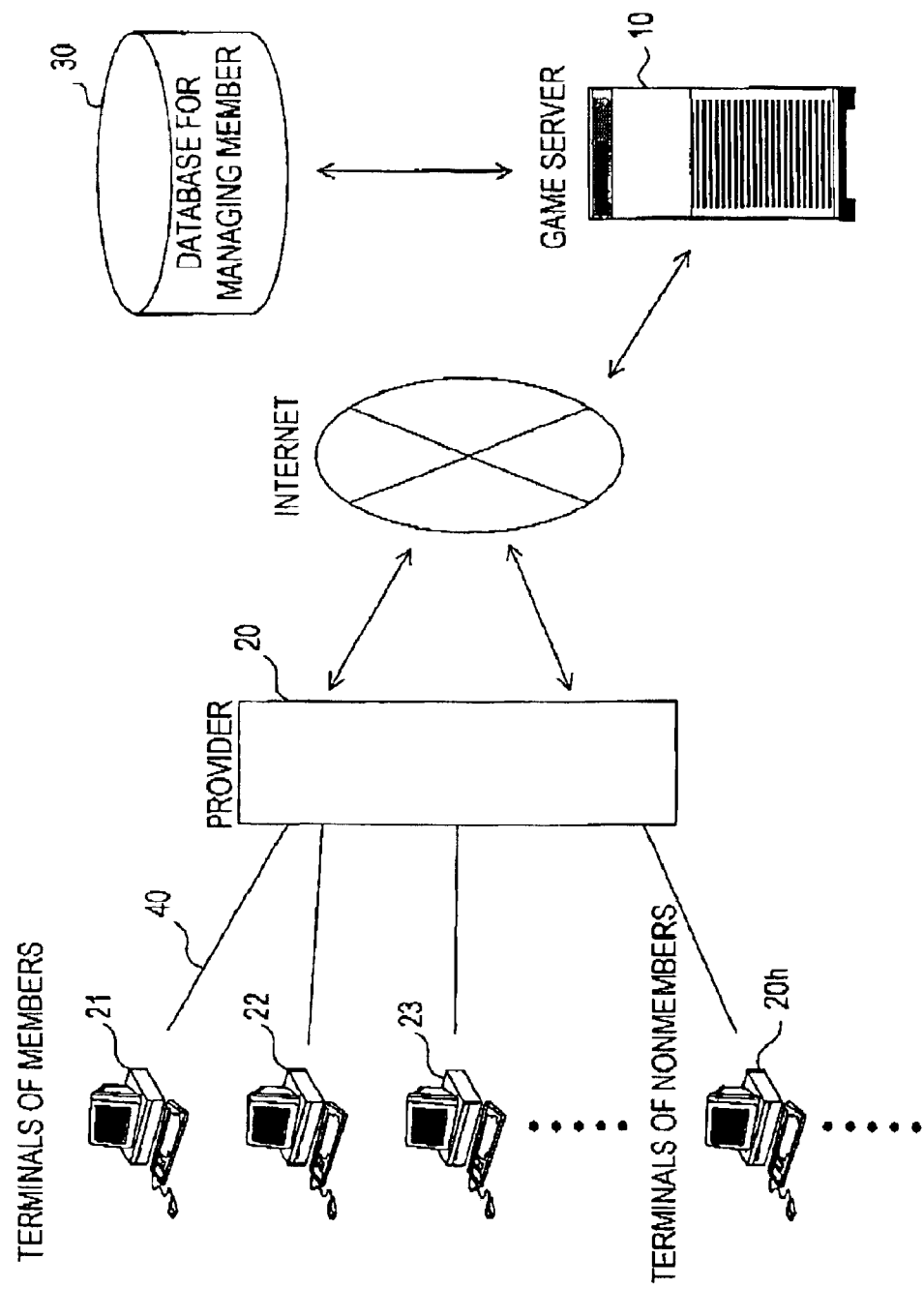
FIG. 1 is a diagram for illustrating a schematic structure of hardware according to a first embodiment of the present invention.

As shown in FIG. 1, the hardware according to the first embodiment to which the present invention is applied comprises a game server 10, which is established on a game provider side, a provider 20, which is connected to the game server 10 via the Internet, terminals 21, 22 . . . of members who participate in a game, which is connected to the provider 20 via a circuit 40, terminals 20h of nonmembers who do not participate in the game and a member managing data base 30, which is linked to a database for a game 10a2 (to be described later) in the game server 10.

Alternatively, the circuit 40 is capable of being selected from a general purpose circuit and a dedicated circuit. The member managing database 30 may be established in an information managing company or may be stored in the game server 10. According to this embodiment, it is assumed that the member managing database 30 is established in the information managing company.

The foregoing game server 10 operates as a server to be used for operating a game (network participation type game system), of which name is "virtual idol fun". This "virtual idol fun" is so called "character" in the game.

Figure 2:
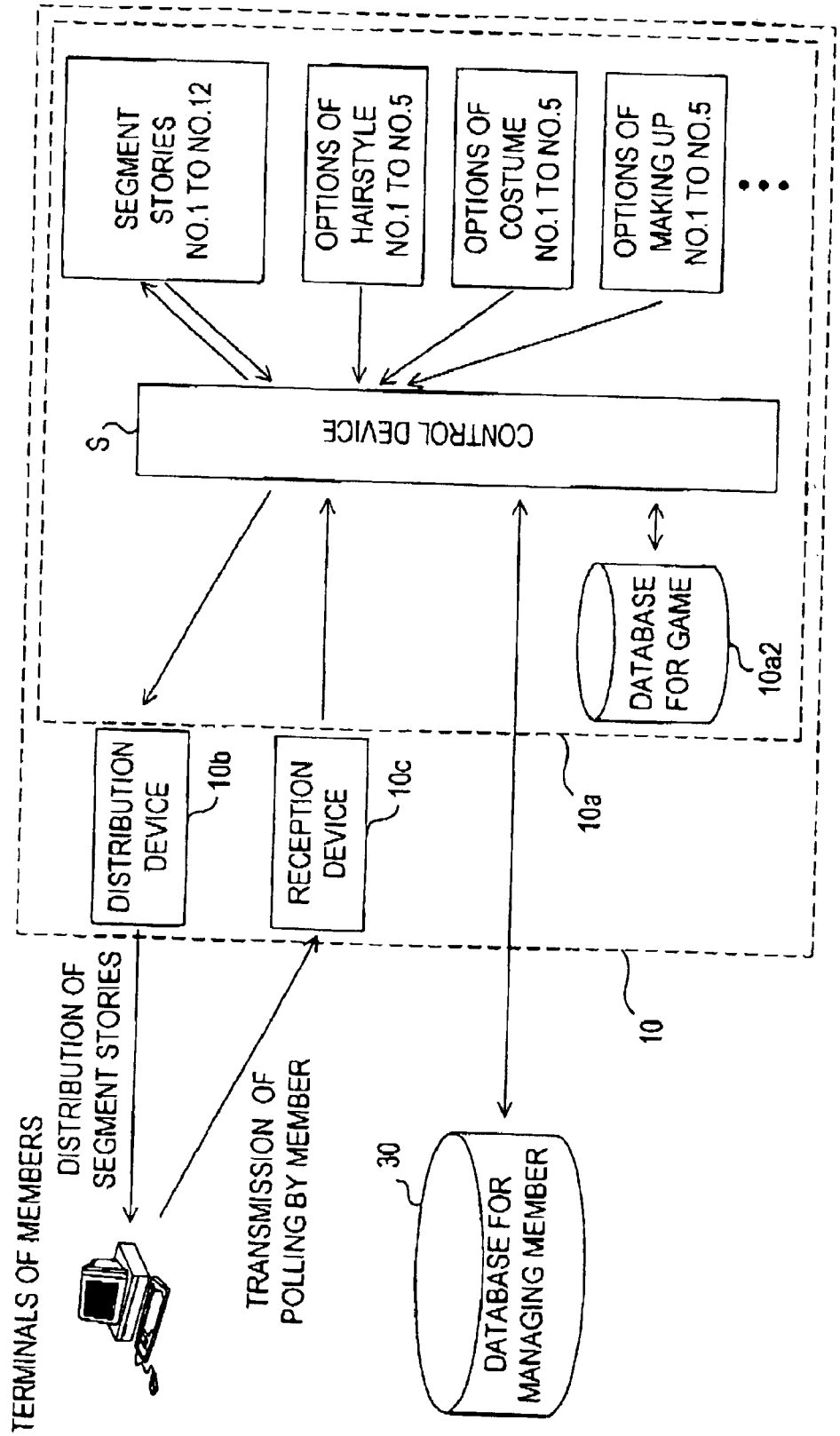
FIG. 2 is a diagram for illustrating a schematic structure of a system according to the first embodiment of the present invention.

As shown in FIG. 2, in the game server 10, contents of the "virtual idol fun" and the database for the game 10a2 for managing data for the game are stored.

In the database for the game 10a2, data such as a member identity (ID) and a point of the member in the game or the like is stored as a record.

The member's terminals 21, 22, . . . serves as terminals to be used by the members who participate in the game of "virtual idol fun". They are connected to the provider 20 via the circuit 40, and further, they are connected to the game server 10 via the Internet. Then, the game of "virtual idol fun" is distributed thereto from the game server 10 via the Internet.

The member managing database 30 comprises a database for managing private information of the member who participates in the game and the information managing company manages its security. The member managing database 30 is linked to the database for the game 10a2, which is stored in the game server 10.

In the member managing database 30, a member identity, a name of a member, a user address of a member and a credit number of a member or the like are stored.

The virtual idol fun employs a Web-three-dimensional technology (an image processing technology on the web) and used a following platform specification.

The communication rate is equal to or greater than 56 kbps, the operation system is Mackintosh (MAC) OS 9 or Windows 98 and over, a central processing unit (CPU) is Win (provided with three-dimensional accelerator) 300 MHz and over or Mackintosh (MAC) (G3 on and after) 300 MHz and over, preferably, 500 MHz. However, the present invention is not limited to such a platform specification when it is applied.

As a browser, an Internet Explorer 4.5 or a Netscape 4.7 or over is employed. As a Plug-in Software, two kinds of a pulse player and a real audio player are employed.

FIG. 2 illustrates a schematic structure of a system of a game of "virtual idol fun".

In the game server 10, in addition to the above described database for the game 10a2, segment stories from No. 1 to No. 12 comprising twelve volumes of a beauty idol bringing up story, which constitutes the game of "virtual idol fun", contents such as options (selection items) included in respective segment stories, for example, options of a hair style of the beauty idol in the segment story No. 1, options of a costume of the beauty idol in the segment story No. 2, options of a make up of the beauty idol in the segment story No. 3, . . . or the like and a control device S for executing the game by using these contents are stored as a software 10a.

The control device S stores the information of the member when the member is admitted in the member managing database 30. Upon executing the game, the control device S uses a record of the member managing database 30 if necessary.

For example, when the member pays the fee to the game provider, the control device S obtains the credit number of the member from the member managing database 30 and collects a predetermined amount of money from the member's account or the member pays the fee by a web money.

Alternatively, the game server 10 is provided with a distribution device 10b for distributing respective segment stories or the like to the terminals of the members and a reception device 10c for accepting the polling result or the like of the options from the terminals of the members.

According to the game of "virtual idol fun" of the present embodiment, the beauty idol bringing up story for bringing up a beautiful girl to be an idol is segmented and they are regularly distributed from the game server 10 to the terminals of the members who participate in the game as a segment story.

Then, the members poll their votes (transmit the poll data from the terminals of the members to the game server 10) to the options of the costume or the like of the beautiful girl, which is given to the members in the beauty idol bringing up story. If the option, which one member selects is identical with the option, which the most members select, this one member is given a point. Thus, the members compete for the point each other.

Figure 3:
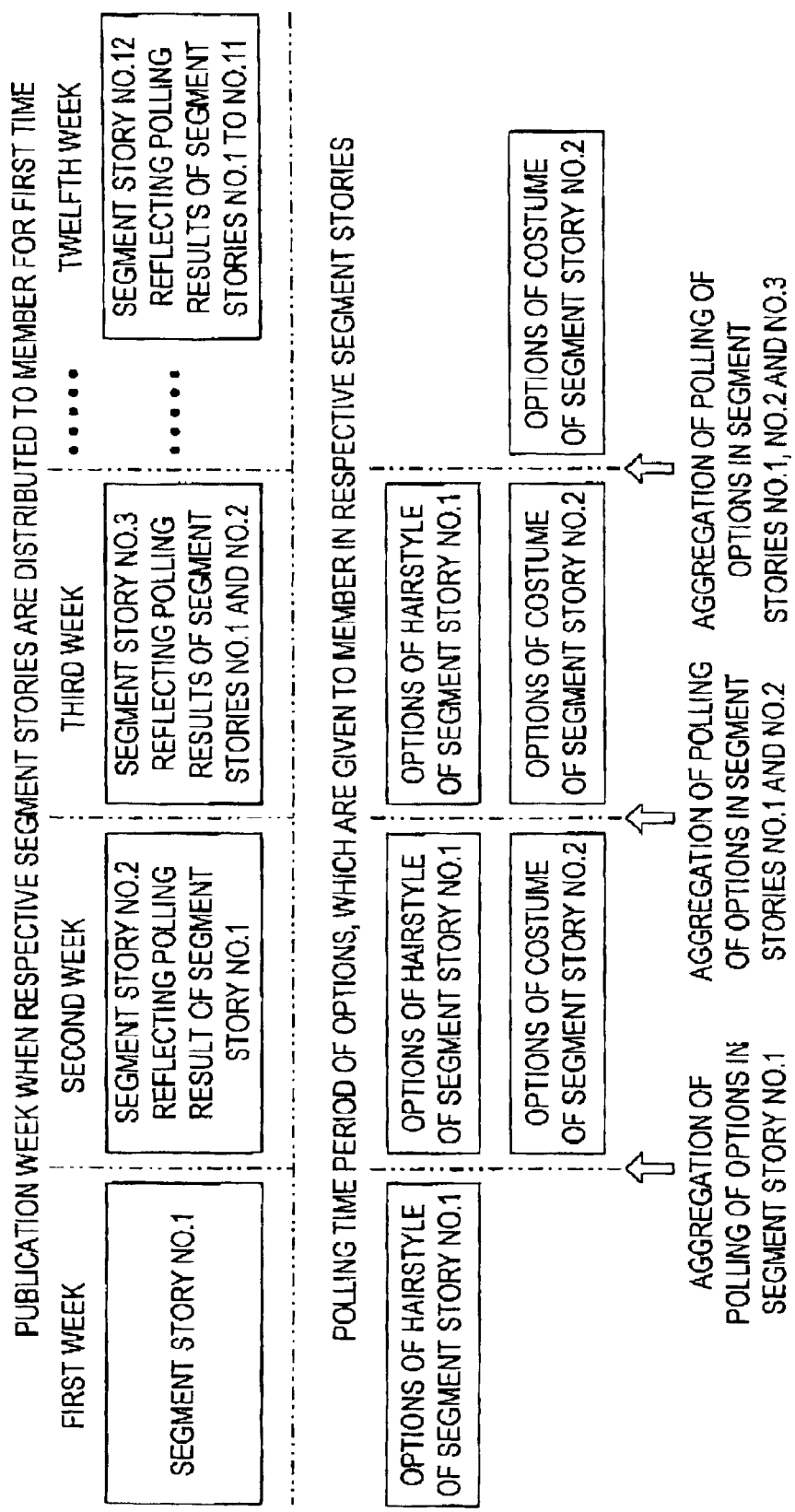
FIG. 3 is a diagram for illustrating time periods of distribution and polling of a segment story according to the first embodiment of the present invention.

As shown in FIG. 3, the segment stories from No. 1 to No. 12 of the twelfth volume comprising twelve volumes of beauty idol bringing up story are distributed from the game provider to the terminals of the members every week from a week when the game starts, namely, the segment story No. 1 is distributed in the first week, the segment story No. 2 is distributed in the second week, the segment story No. 3 is distributed in the third week, . . . , and the segment story No. 12 is distributed in the twelfth week.

In respective segment stories, the selection items including the options are provided to the members. The members select the item from the selection items and poll the votes to the game provider (transmit the poll data to the game server 10).

The member is capable of polling the vote to the given options only once.

The polling time period is three weeks from the week when respective segment stories are started to be distributed and the game server 10 aggregates the polling for every week.

Then, the game server 10 reflects the aggregating result for every week on next and after segment stories and distributes the next and after segment stories on which the aggregating result is reflected to the terminals of the members on and after a next week.

Further, this processing is carried out for every week, in total three times. Then, the polling is closed if three weeks has been passed from the week when the distribution is started.

If the polling of one member is identical with the final polling of the most members (after three weeks), the point is given to this one member.

In the next place, a processing of a system of a game of "virtual idol fun" will be explained.

As shown in FIG. 2, it is assumed that the segment story No. 1 is distributed from the game server 10 to the terminals of the members.

Then, the members to catch the segment story No. 1 is provided with options of a hairstyle of the virtual idol in the segment story No. 1.

For example, a first option of the hairstyle is a bob and a second option of the hairstyle is a longhair cut . . . or the like.

Therefore, the members select the options and transmit the polling data from the terminals of the members to the game server 10, so that they give the members' intentions to the game provider (refer to FIG. 4).

Figure 5A:
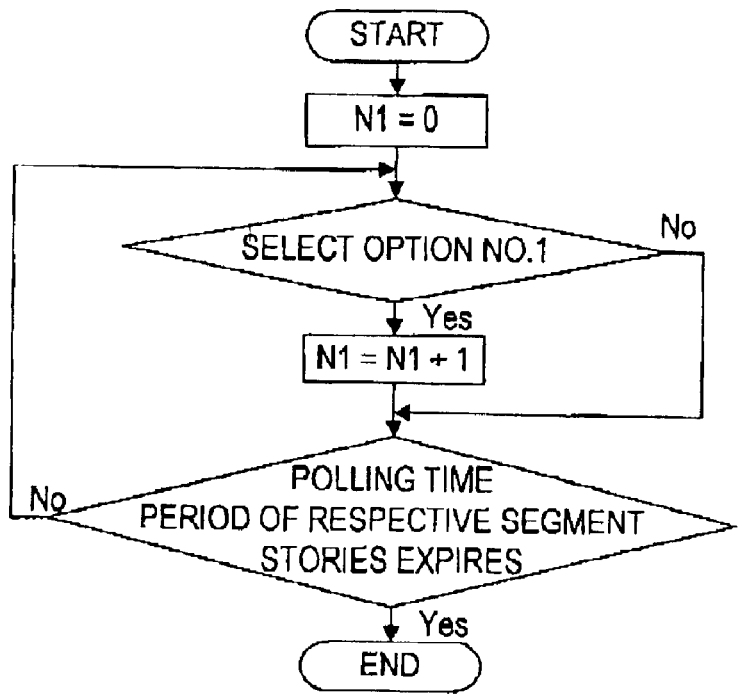
FIGS. 5A and 5B are diagrams for illustrating a method for aggregating polling of selection items and a method for counting a point of a member.

Then, poll aggregating device S1 of the control device S, which is stored in the game server 10, counts the option which the member is selected as a point. For example, in the case that the member selects the option No. 1, the poll aggregating device S1 adds 1 to a parameter N1 representing the number of polling of the option No. 1 as shown in FIG. 5A.

In the case of the data of other options, the poll aggregating device S1 counts the number of polling in the same way.

Alternatively, the poll aggregating device S1 records the option to which the member polls the vote in the database for the game 10a2 as the member's record with the member's identity being a key.

At the same time, as shown by a mark (1A) in FIG. 4, a combining device Su1 combines the data Hs of the option of the hairstyle, which is transmitted by the member, with first original data Po1 to create data Ps1 of a new segment story No. 1. Then, the data Ps1 of the new segment story No. 1 is immediately distributed to the terminals of the members from the game server 10.

Accordingly, after polling the vote, the member is capable of enjoying his or her polling result immediately in the segment story No. 1, which he or she is catching.

Upon aggregating the selection items of the segment story No. 1, namely, after one week, two weeks and three weeks from the week when the options are put on view, the poll aggregating device S1 compares the number of polling of respective options, which are counted by a method shown in FIG. 5A.

Then, as shown by a mark (1B) in FIG. 4, combining device Su2 combines the data MHs of the option of the hairstyle, to which the most members poll the votes, with a next second original data Po21 to be distributed in the next week to create data Ps21 of a new segment story No. 2.

In the next week, the game server 10 distributes the segment story No. 2 to be created by the data Ps21 of the segment story No. 2 to the terminals of the members.

Then, upon aggregating the final result after three weeks, the poll aggregating device S1 obtains the options of the hairstyle, to which respective members poll the votes, from the database for the game 10a2 and compares them to the option of the hairstyle, to which the most members poll the votes.

Figure 5B:
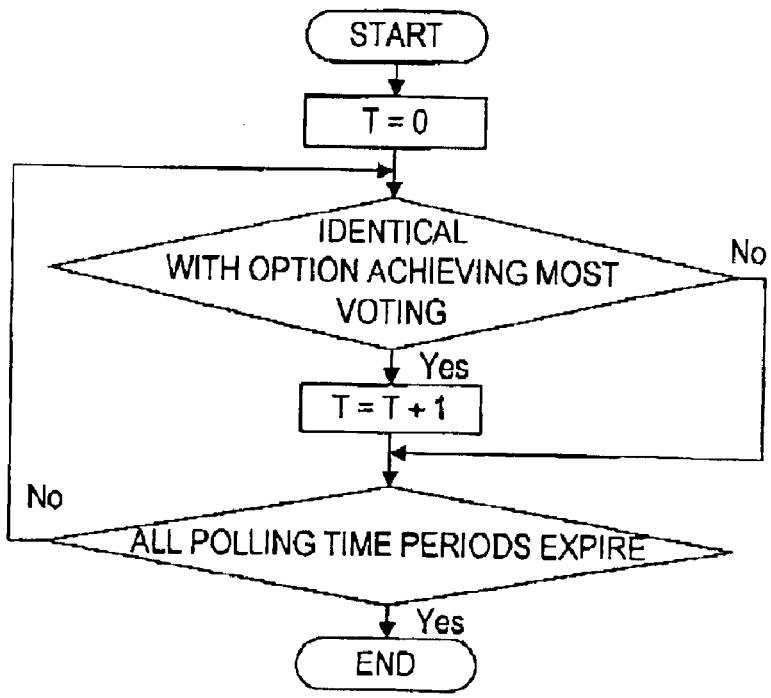

After that, in the case that the option, to which one member polls the vote, is identical with the option, to which the most members poll the votes, as shown in FIG. 5B, a point is added to a point T of this member.

On the contrary, in the case that the option, to which one member polls the vote, is not identical with the option, to which the most members poll the votes, a point is not given to this member.

The poll aggregating device S1 performs the above described point calculation processing for all members who poll the votes.

The same processing is carried out with respect to the segment stories No. 2 to No. 12.

When the game is over and all polling in the segment stories No. 1 to No. 12 is finished, the poll aggregating device S1 compares the total point T of respective members, so that the points of the members are placed in order.

In the next place, a home page of a game provider for realizing the above described game of "virtual idol fun" will be explained.

Figure 6:
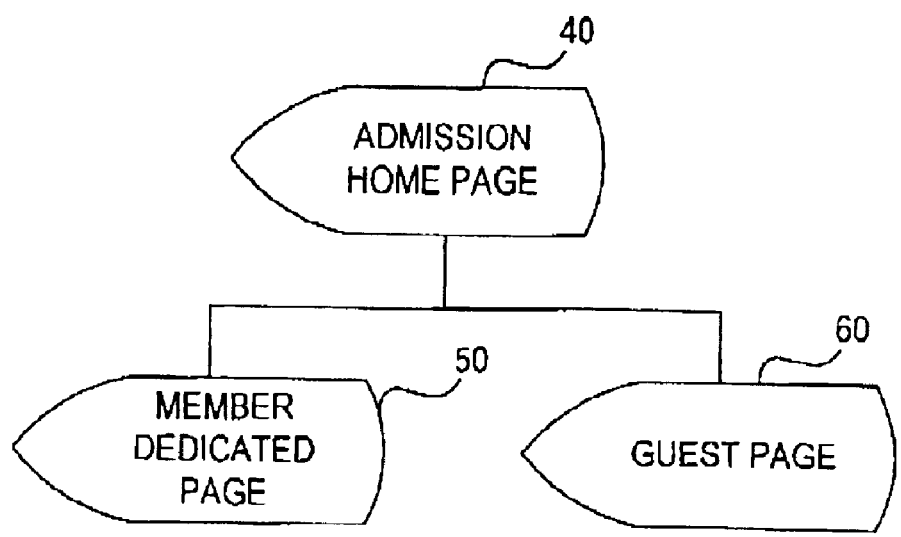
FIG. 6 is a diagram for illustrating transition of a page according to the first embodiment of the present invention.

FIG. 6 is a diagram for illustrating transition of pages as contents of a "virtual idol fun".

An admission home page 40 serves as an admission home page of the game provider, of which address is generally opened, and a page for introducing a game of "virtual idol fun".

A member dedicated page 50 transited from the admission home page 40 is a dedicated page for the members who participate in the game. On the other hand, a guest page 60 transited from the admission home page 40 is a page in which contents of the "virtual idol fun" are introduced for general people who do not participate in the game.

Figure 7:
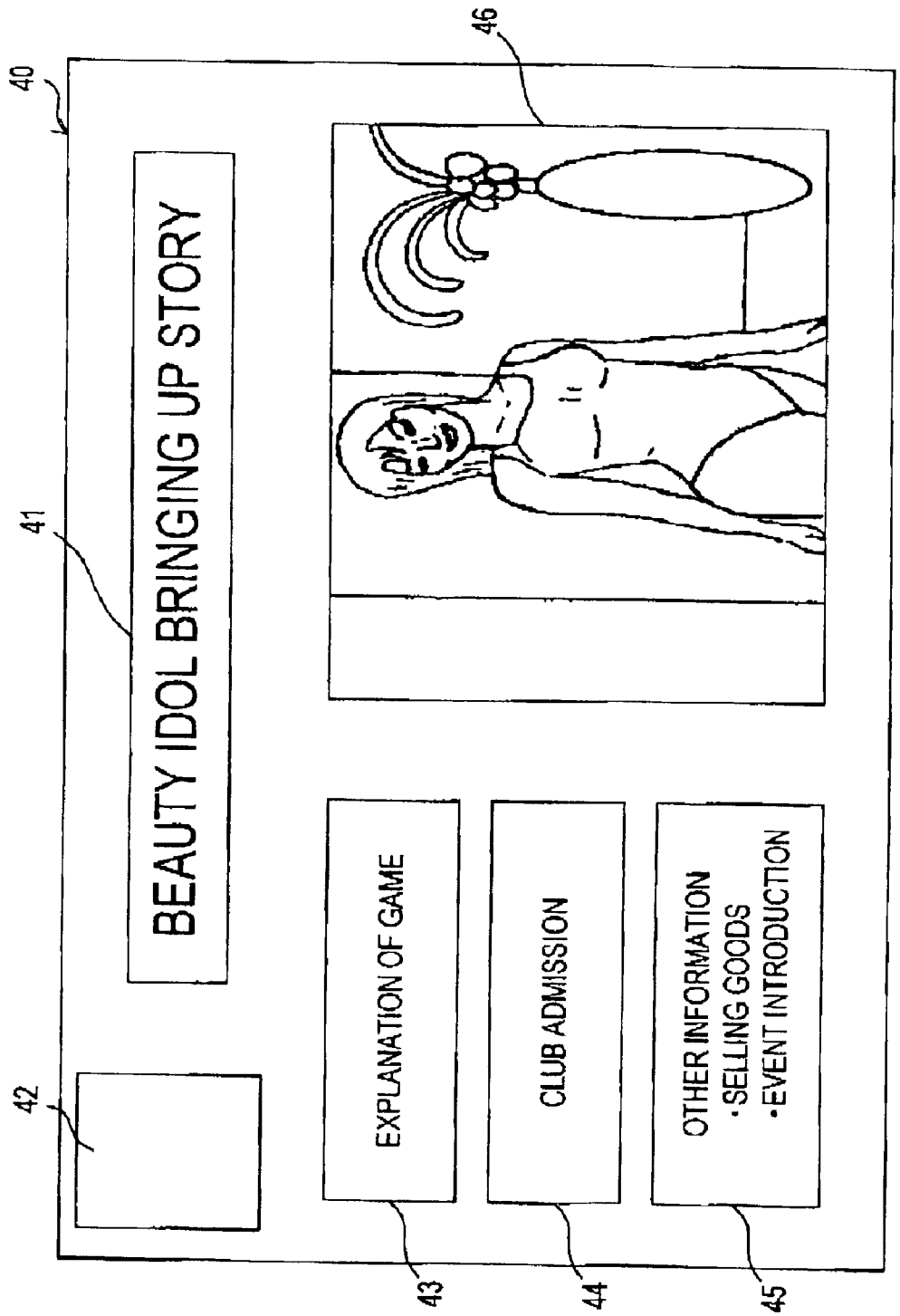
FIG. 7 is a diagram for illustrating an admission home page according to the first embodiment of the present invention.

The admission home page 40 shown in FIG. 7 is described in a language capable of being inspected via the Internet, namely, HTML (Hypertext Markup Language), provides a gateway for participating the game of "virtual idol fun" to the general people and gives the explanation of a manner for admission of the game and how to play the game or like.

On the upper portion of the admission home page 40, a main title display 41 of the story of the "virtual idol fun" is arranged and on the left portion thereof, a logo 42 of a game provider is arranged.

On the center portion of the admission home page 40, an image picture display section 46 is arranged.

The image picture display section 46 is capable of being viewed by eyes even if a Plug-in Software is not installed. In other words, the image picture display section 46 serves as an advertising roll in such a manner that it displays the image of the "virtual idol fun" at a high speed to give the impression only to the general people.

On the left portion of the image picture display section 46, a game explanation 43 is arranged. By clicking it, how to play the game of "virtual idol fun" is displayed.

Below the game explanation 43, a club admission 44 is arranged. By clicking it, the manner for admission (participation) of the game of "virtual idol fun" is displayed.

Below the club admission 44, other information 45 is arranged. By clicking "goods sale", various goods associated with the "virtual idol fun" are introduced and by clicking an event introduction, various events associated with the "virtual idol fun" are introduced.

In the next place, a member dedicated page 50 shown in FIG. 8 will be explained below.

The Plug-in Software is installed in advance in the terminals (a personal computer) of the members who play the game as watching the member dedicated page 50.

Above the member dedicated page 50, a main title display 51 is arranged, so that a main title of a story of the game of the "virtual idol fun" is displayed.

Further, below the main title display 51, a sub title display 51s is arranged, so that the sub title of respective segment stories comprising a story of the "virtual idol fun" by twelve stories is displayed.

On the left portion of the main title display 51 and the sub title display 51s, a publication volume number 52 is arranged, so that what number of story of the segment stories is represented.

On a center portion of the member dedicated page 50, a Web-three-dimensional display section 53 is arranged, so that a story of the "virtual idol fun" is displayed.

In order to display the image on the Web-three-dimensional display section 53, the Plug-in Software is needed. As described above, the Plug-in Software is downloaded on the terminal of the member who participates in the game when the member is admitted in the game (i.e., when the member participates in the game).

Alternatively, the member may install the Plug-in Software, which is attached to a refill album (to be described later), in his or her terminal by oneself.

On a picture to be displayed in the Web-three-dimensional display section 53, it is possible for the member to turn the idol, which is projected on a picture, sideways or backward by giving the instruction from a controller 56 due to the Web-three-dimensional technology.

A selection button 54 on the right side of the Web-three-dimensional display section 53 comprises a selection button by which the member selects the option (selection item) to be exhibited in respective segment stories.

On an option image display portion 55 on the right side of the selection button 54, images of the options in association with respective selection buttons 54 are displayed (as a catalog).

Selection buttons 54*a* and 54*b* comprise selection buttons of free-of-charge. The image options in association with these buttons are not displayed on the option image display portion 55.

Then, the game server 10 recognizes that the member selects any one of buttons 54*a* and 54*b* and polls the vote to it when the member clicks any one of the buttons 54*a* and 54*b*.

Selection buttons 54*c* and 54*d* comprise pay selection buttons and the images thereof are displayed on the option image display portion 54 when the member clicks one of them once. Further, when the member clicks that selection button again, the game server 10 recognizes that the member selects that selection button and polls the vote to it.

Additionally, the selection buttons 54*c* and 54*b* are pay buttons, so that a predetermined amount of money for this selection is automatically paid from the account of this member to the game provider in advance or this member pays the fee by the web money.

A selection button 54*e* is a pay button, however, if the member clicks this button, its image is not displayed on the option image display portion 54. If the member clicks this button again, the game server 10 recognizes that the member selects the selection buttons 54*e* and polls the vote to it, so that the selection buttons 54*e* is a blind button such that the member is capable of recognizing its selection result in the segment story only after the member selects this button.

Additionally, this button is a pay button, so that a predetermined amount of money for this selection is automatically paid from the account of this member to the game provider in advance or this member pays the fee by the web money.

Citing an example of a hairstyle as the selection item of the above described selection buttons, for example, the selection button 54*a* is a bob, the selection button 54*b* is a longhair cut, the selection button 54*c* is a permanent hair, the selection button 54*d* is a ponytail and the selection button 54*e* is the latest hairstyle.

The controller 56 below the option image display portion 55 serves as a controller portion allowing the members to stop the picture of the segment story, which is displayed on the Web-three-dimensional display section 53, and play this picture, or transmit the member's intention that he or she does not poll the vote to the exhibited options or turn the idol, which is projected on a picture, sideways or backward.

A publication selection button 57 below the member dedicated page 50 comprises a button for selecting the number of volume of the segment story of the virtual idol fun caught by the members. Further, the members can select and catch the segment story, which has been already distributed, only for the segment story, of which the pay option is selected.

Figure 9:
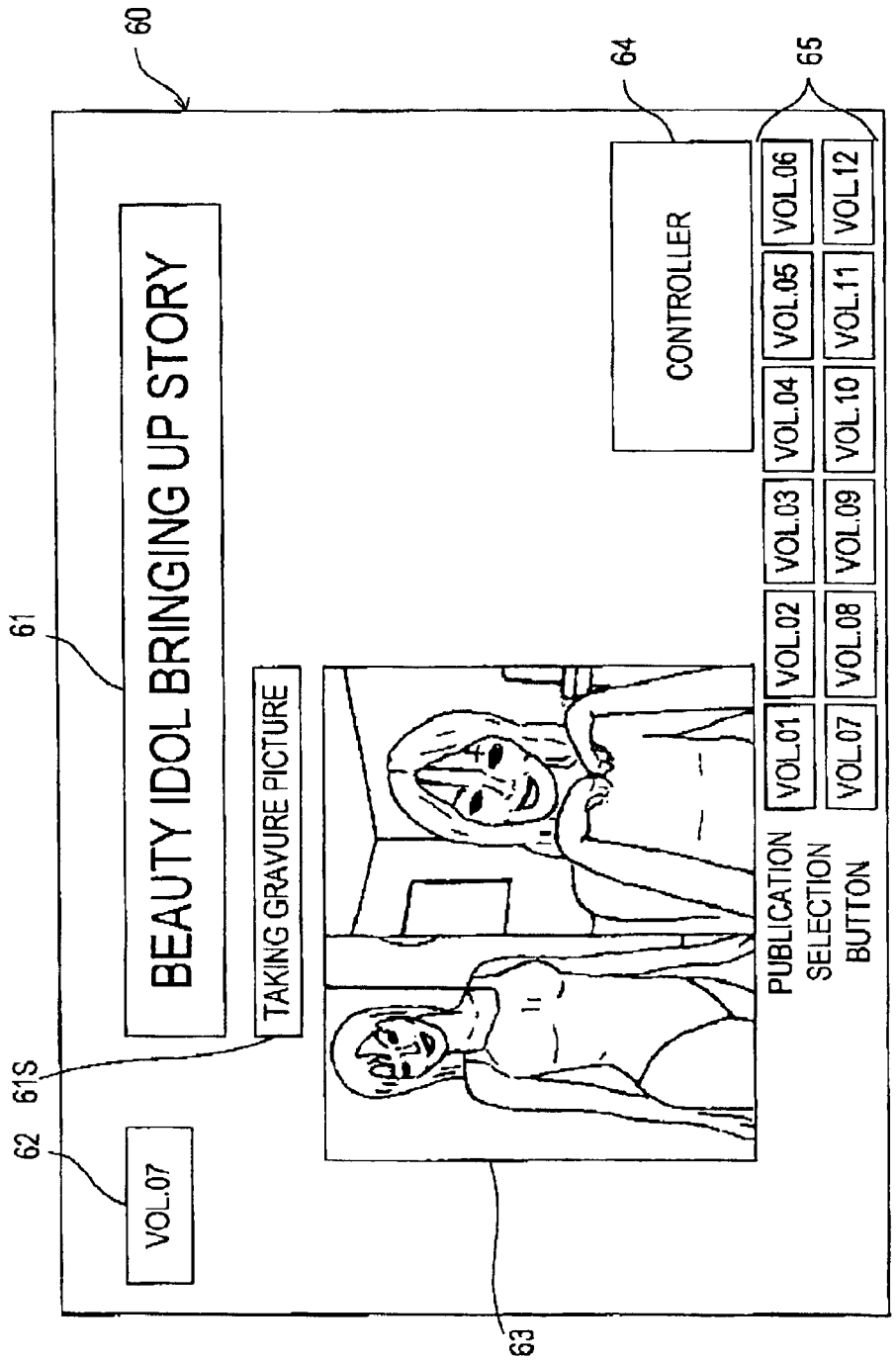
FIG. 9 is a diagram for illustrating a guest page according to the first embodiment of the present invention.

The guest page 60 shown in FIG. 9 is described in HTML and the guest page 60 serves to give the persons who do not participate in the game incentive to participate in the game by making them artificially play the game of "virtual idol fun".

A main title display 61 above the guest page 60 displays a main title of a story of a game. A beauty idol bringing up story is displayed on the main title display 61 as the main title of the story of the "virtual idol fun".

A sub title display 61*s* below the main title display 61 displays sub titles of respective twelve segment stories that constitute the game of "virtual girl bringing up story".

On the left portion of the main title display 61 and the sub title display 61*s*, a publication volume number 62 is arranged, so that what number of story of the segment stories is represented.

On a Web-three-dimensional display section 63 on a center portion of the guest page 60, a static image of the "virtual idol fun" is reproduced.

Alternatively, installing the Plug-in Software in the terminals enables the image moving in the web three dimensions as same as the game on the Web-three-dimensional display section 63 and further, enables the member to listen to the voice.

A controller 64 on the right portion of the Web-three-dimensional display section 63 serves to stop the image, which is displayed on the Web-three-dimensional display section 63 or play this image.

Alternatively, installing the Plug-in Software in the terminals enables the idol, which is projected on a picture, turn sideways or backward by using the controller 64 as well as the game.

A publication selection button 65 below the controller 64 comprises a button for selecting the number of volume of the segment story of the beauty girl bringing up story caught by the members. Further, the members can select and catch the segment story, which has been already distributed.

Figure 10:
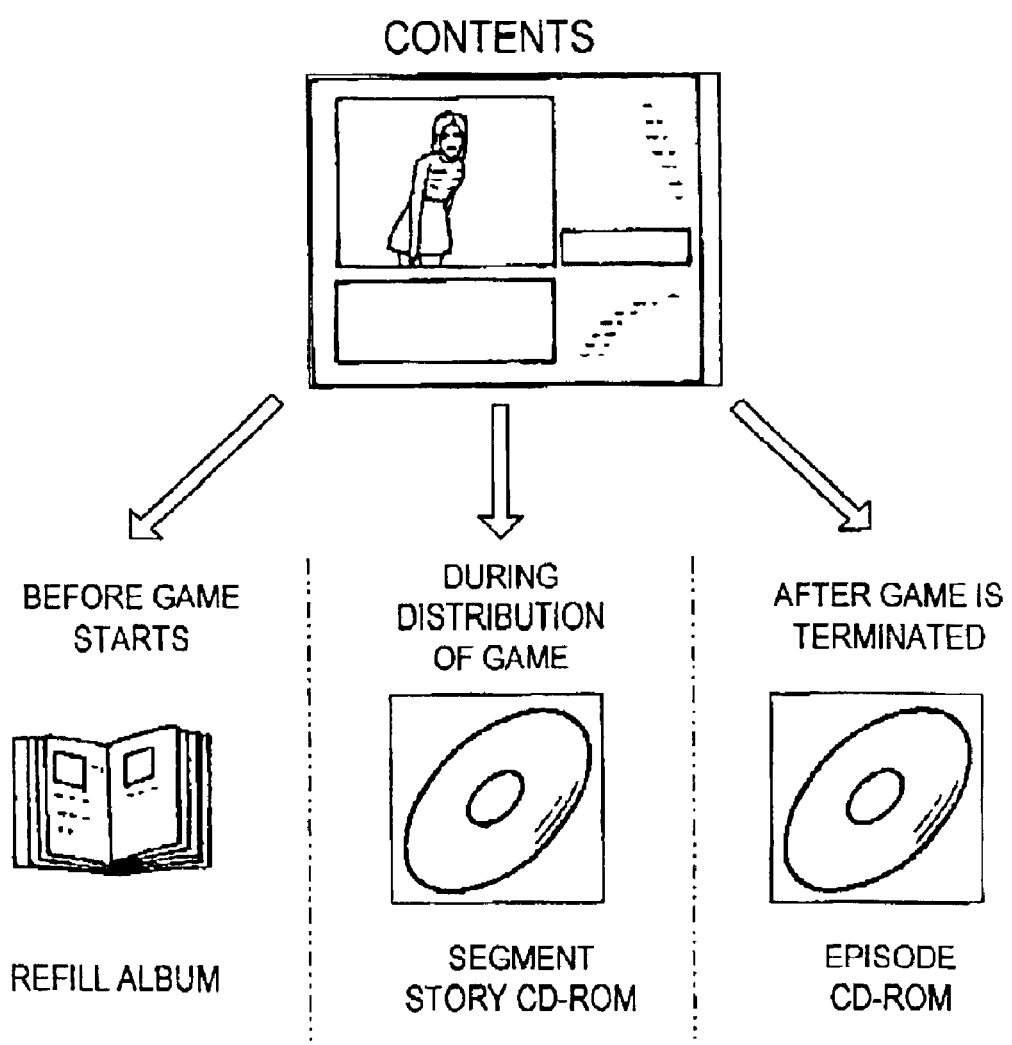
FIG. 10 is a diagram for illustrating deployment of a content according to the first embodiment of the present invention.

FIG. 10 illustrates an album and a CD, which are sold or distributed for free in connection with a game of "virtual idol fun" on a network.

Before the game of "virtual idol fun" is started, the game provider sells or distributes for free a refill album in order to make the "virtual idol fun" commonly and widely known and recruit many participants in the game.

In the refill album, a content of the "virtual idol fun" is explained and a mini photo album of the beauty idol who is a heroin of the beauty idol bringing up story is edited.

Further, the refill album is provided with the Plug-in Software for playing a moving image of the "virtual idol fun" and a holder for a CD to be sold in near future.

During distribution of the game of "virtual idol fun", after respective segment stories are distributed, a QT (Quick Time) movie in which respective segment stories are recorded is edited in a CD-ROM and they are sold by the game provider as a segment story CD-ROM (computer readable recording medium).

Alternatively, respective segment stories are recorded in the CD-ROM by using an AVI (Audio Video Interleave) of Windows and they are sold by the game provider as a segment story CD-ROM (computer readable recording medium).

The segment story CD-ROM comprises one piece of CD-ROM for each segment story.

Accordingly, respective segment stories are recorded in the CD-ROM in a movie format, so that the stories are capable of being caught in more excellent image quality and more excellent voice quality than the image quality and the voice quality during playing the game.

In the CD-ROM, respective segment stories reflecting all selection items are collected. In addition to this, the CD-ROM includes an unpublished mode, a precious costume of the beauty idol and making up of the beauty idol, so that a content of the CD-ROM drives willingness to buy of the members.

After the game of "virtual idol fun" is completed, the game is edited to an episode CD-ROM (computer readable recording medium) to be sold by the game provider.

The episode CD-ROM comprises one piece of CD-ROM including all segment stories.

By the episode CD-ROM, it is possible to catch the story with arbitrarily selecting the selection items, which are exhibited in the story, and with reflecting the selected item on the story. According to the episode CD-ROM, it is possible to arbitrarily play the game again through all stories.

In other words, it is possible to select all options in the segment stories.

Further, the episode CD-ROM includes an unpublished mode, a precious costume of the beauty idol and making up thereof, so that contents of the episode CD-ROM drive willingness to buy of the persons other than the members.

Alternatively, respective segment stories are recorded in the episode CD-ROM using a Web-three-dimensional polygon data different from movie format data recording in the segment story CD-ROM. Further, the episode CD-ROM is capable of being caught only by the terminal (personal computer) in which the Plug-in Software is installed on the browser of the Internet.

Then, a summary of the game will be explained.

In advance of distribution of the game, the above described refill album is commonly sold or distributed for free, so that it has been well known that the game of "virtual idol fun" is started to be distributed.

Additionally, the progress of the game is carried out by the software of the above described system.

For example, the game of "virtual idol fun" is constituted by the beauty idol bringing up story, which is constituted by twelve segment stories. As shown in FIG. 3, one segment story per week is distributed from the game provider to the terminals of the members and the story is completed in twelve weeks.

In respective segment stories, the options are provided to the members, so that the members select any option and transmit their intentions to the game server 10 of the game provider from the terminals of the members.

After the member selects the option, the segment story in which a content of the selected option is reflected is developed.

Alternatively, the members can poll the votes to the given options only once.

At the end of the present week, the game provider aggregates the polling result of the options of the members. Then, reflecting a content of the option, to which the most member poll the votes, on the next and after segment stories to be distributed in the next week (all next and after segment stories to be distributed in the next week), these next and after segment stories are distributed to the members.

Accordingly, the members know the polling result in the segment story in a next week.

The polling time period is three weeks from the week when respective segment stories are started to be distributed and the game server 10 aggregates the polling for every week.

Thus, the polling of respective segment stories has been continued for three weeks, so that the total number of the polling is accumulated per week and a content of the option, to which the most member poll the votes, is reflected on the next and after segment stories to be distributed in the next week (all next and after segment stories to be distributed in the next week).

Further, this processing is carried out for every week in total three times, so that a content of the option which is reflected on the next and after segment stories (the option, to which the most member poll the votes) may be different weekly.

In this way, the polling is closed in three weeks.

If the polling of one member is identical with the final polling of the most members (after three weeks), the point is given to this one member.

The point to be given to the members is certified in such a manner that odds of the point are twofold in a publication week (a first week).

This intends to prevent the members who polled the votes in the publication week from suffering disadvantage since the members, who polled the votes after the publication week (the first week), for example, at a second week or at a third week, can know the accumulation number of the polling.

Every when distribution of each of segment stories is completed, the segment story CD-ROM including a content of the segment story in the last week is sold by the game provider.

Thus, when the selection items including the options are provided to the members in respective segment stories and all stories to which the members poll the votes are completed, the game provider calculate all points depending on the polling of respective members from the first week to the twelfth week, so that some members who acquire high points are provided with prizes from the game provider.

After that, the episode CD-ROM collecting all stories is sold by the game provider.

In the next place, the progress of the game will be explained with reference to FIG. 11 in due course.

(Step 1)

The game provider introduces the game of "virtual idol fun" to the general people by the admission home page 40 (refer to FIG. 7), of which address is opened to the general people, by using the game server 10.

In other words, an impression of the virtual idol of the "virtual idol fun" is given to the general people by using the image picture display section 46.

Then, the general people can know how to play the game by clicking the game explanation 43. Additionally, the general people can know how to be admitted to a club of the "virtual idol fun" (how to participate in the game) by clicking the club admission 44.

Alternatively, by clicking respective items of other information 45, the general people can know the related information of the "virtual idol fun".

Thus, the game provider advertises for general people who are admitted to the fun club by the admission home page 40.

(Step 2)

The person who sees the admission home page 40 makes a study of admission into the fun club.

(Step 3-1)

The person who postpones the admission into the fun club is introduced to the guest page 60 (refer to FIG. 9).

On the guest page 60, a static image of the segment story, which is displayed on the sub title display 61s, is reproduced on the Web-three-dimensional display section 63.

Alternatively, installing a designated Plug-in Software in the terminal enables the image as same as the game on the Web-three-dimensional display section 63 and further, enables the member to listen to the voice.

Then, by selecting the publication selection button 65 by clicking, default (prescribed) stories of the segment stories which have been already distributed, namely, stories in which the prescribed selection items for free are reflected are selected to be caught. Alternatively, by using the controller 64, it is possible to control the image which is displayed on the Web-three-dimensional display section 63.

In this way, the game provider gives the persons who do not participate in the game incentive to participate in the game by making them artificially play the game of "virtual idol fun" with the guest page 60.

(Step 3)

The person who desires to participate in the game is admitted into the fun club by inputting his or her name, his or her mail address and his or her credit number in the admission home page to become a member.

At the same time when the member is admitted into the club, the terminal of the member is recognized by the game server 10 with a function of cookie as well as the name, the mail address and the credit number of the member are recorded in the member managing data base 30 as the member information.

Figure 8:
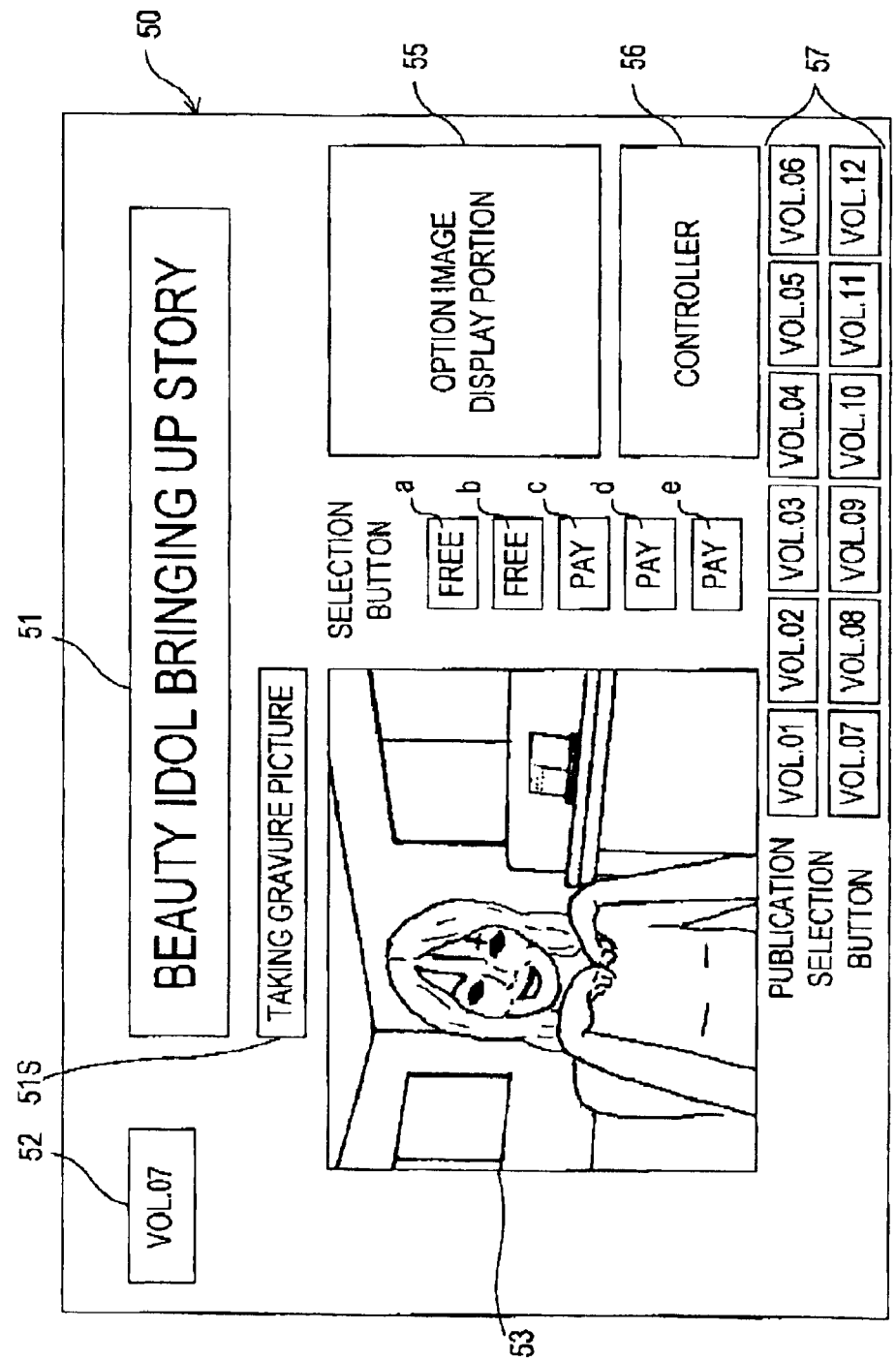
FIG. 8 is a diagram for illustrating a member dedicated page according to the first embodiment of the present invention.

Then, the picture is transferred from the admission home page 40 to the member dedicated page 50 (refer to FIG. 8).

The member catches the game from the first volume of the segment stories of the beauty idol bringing up story of the "virtual idol fun" by clicking the publication selection button 57.

Additionally, the member is capable of participating in the game in the arbitrary time period until the gale of "virtual idol fun" is terminated and he or she catches the game from the first volume of the segment stories in due course.

(Step 4)

The options are given to the member at any timing during the segment stories have been played.

Then, after the member selected the option, the segment story, on which a content of the selected option is reflected, is developed.

For example, the beauty idol asks the all members, "What hairstyle is preferable for taking a gravure picture tomorrow? What do you think?"

For example, in the member dedicated page 50 (refer to FIG. 8), the selection button 54a is a bob, the selection button 54b is a longhair cut, the selection button 54c is a ponytail, the selection button 54d is a permanent hair and the selection button 54e is a blind button (the member cannot know the hairstyle of this button before selecting this button but can know the hairstyle of this button only after he or she selects this button).

Contents of respective selection buttons are literally displayed on the option image display portion 55.

The selection of the selection button 54a and the selection button 54b is free of charge, so that the images of these options are not displayed on the option image display portion 55 and the member clicks these options, respectively to select them.

The selection of the selection button 54c and the selection button 54d are pay buttons, so that if the member clicks them, the images of these options are displayed on the option image display portion 55.

Further, if the member clicks the button once more, the game server 10 recognizes that this option is selected and the member polls the vote to this button.

The selection button 54e is a pay blind button, so that the image thereof is not displayed on the option image display portion 55 even when the member clicks this button. If the member clicks it again, the game server 10 recognizes that the selection button 54e is selected and the member polls the vote to this button.

Further, only after the member selected the selection button 54e, he or she knows a content of the selection button 54e in the segment story.

Alternatively, the polling of the options is closed after three weeks after the segment story is published.

By the mean time, the members who participate in the game behind time catch the game from the first volume of the segment stories in due course and poll the vote. However, with respect to the options of which polling is closed, the segment stories, on which the options selected by these members are reflected, are distributed even on the next week and after.

(Step 5)

If the publication of the segment story does not reach the twelfth volume, the processing is returned to the step 6.

If the publication of the segment story reaches the twelfth volume, the game is terminated on the twelfth week and the processing is returned to the step 7.

(Step 6)

On the next week of the step 4, the game provider calculates the polling result of the last week and reflects the content of the option, to which most members poll the votes. Then, the game server 10 distributes the segment stories after the segment stories, which are published in this week, to the terminals of the members.

If the member logs in the admission home page of the game provider in order to play the game, the game server 10 recognizes the terminal which is used by the member with a function of cookie, so that the admission home page is immediately transferred to the member dedicated page 50 and the member can play the game there.

Alternatively, if the cookie of the terminal of the member is not turned on, the member inputs his or her name and his or her pass word in the admission home page of the game provider after log-in, so that the admission home page is transferred to the member dedicated page 50 and the member can play the game there.

After that, the game provider sells the segment story CD-ROM including the content of the segment story in the last week, on which the polling result in the last week is reflected.

Hereinafter, until all stories are completed, the (step 6) and the (step 4) are repeated.

(Step 7)

If the publication of twelve volumes of the segment stories is completed and the time period of the polling is terminated, the game provider aggregates a total point of the members and some hundreds members who acquire high points are provided with prizes from the game provider. It could be various kinds of prize such as commercial goods, point on the web or the like.

After the game was over, the game provider sells the episode CD-ROM collecting all stories.

It is selective that the point to be given to the member depending on the polling result is increased as the volume of the segment story is getting close to the end.

Alternatively, according to the above described embodiment, the total point of the members are aggregated after the time period of the polling is terminated and some hundreds members who acquire high points are provided with prizes. However, upon polling the votes to respective segment stories, the members whose polling is identical with the polling result may be provided with the prized.

Additionally, it is also possible to provide the prizes to the members as adding the points of respective members until the last time to the polling result of respective segment stories.

The numbers of the members who are provided with the prizes may be selective.

Further, a unit for distributing the same segment story is defined as one week. However, the time period thereof is capable of being arbitrarily selected.

In the same way, the time period of the polling of respective segment stories is defined as three weeks. However, the time period thereof is capable of being arbitrarily selected.

Alternatively, according to the above described embodiment, the odds with respect to the polling result of respective segment stories are defined two fold in a publication week (a first week) of respective segment stories. However, the magnification of the odds is capable of being arbitrarily selected and it is needless to say that the point to be given to the members in respective segment stories is capable of being variously selected. For example, the odds of the point of the members may be lowered as the aggregation of the polling comes near to end.

Additionally, according to the above described embodiment, the options are given to the members in respective segment stories, the polling of the members are recruited and the next and after segment stories, on which the most dominant polling result is reflected, are distributed to all members. However, it is also possible to distribute the next and after segment stories, on which the polling result of each member is reflected, are distributed to each member.

In other words, as shown in FIG. 4, according to the processing shown in a mark (1B), the data Ps21 of the segment story No. 2 may be created by using the data Hs of the hairstyle, which is transmitted by each member, in place of the data MHs of the option of the hairstyle, to which most members poll the votes.

Hereinafter, if the segment story No. 3 to the segment story No. 12 are treated in the same way, the game provider is capable of distributing the segment story No. 1 to the segment story No. 12 depending on respective members' preferences.

Alternatively, according to the above described embodiment, the changeable manners such as the hairstyle, the costume and the photograph of the entire body of the character are defined as options. However, it is also possible to define various things such as the voice of the character, a piece of music that the character sings, a dance that the character plays, the feeling of the character, the story and the atmosphere or the like as options.

Additionally, according to the above described embodiment, the segment story reflecting the intentions of the members are the next segment story in the next and after segment stories. However, it is selective which segment story in the next and after segment stories reflects the intentions of the members.

In other words, the segment story reflecting the member's intention is capable of being selective. For example, the segment story reflecting the member's intention may be defined as the segment story to be distributed after three weeks or the segment story to be distributed after five weeks.

Alternatively, according to the above described embodiment, an example such that one option is given in one segment story is indicated. However, it is also possible that a plurality of options is given in one segment story.

In the next place, a second embodiment applying the present invention will be explained below.

The second embodiment employs a different manner for aggregating the members' polling in the game of "virtual idol fun", which is described in the first embodiment. Further, a structure of the software realizing the game system is different from that in the first embodiment.

Other constitutional components are perfectly same as those in the first embodiment, so that the same components as those in the first embodiment are provided with the same reference numerals and the explanations thereof are herein omitted.

Alternatively, the activation of the system is executed by the software of the system as same as the first embodiment.

Figure 12:
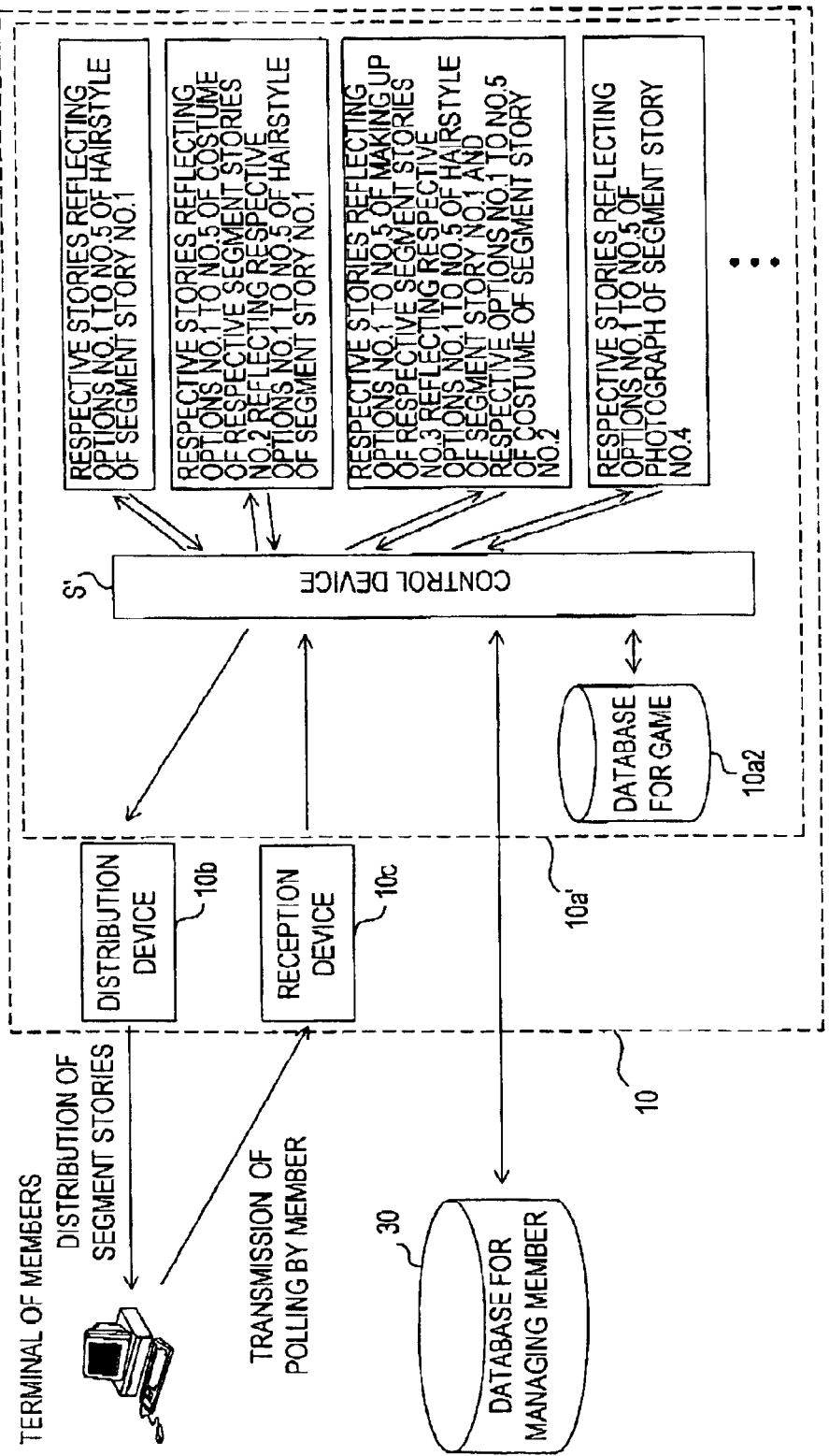
FIG. 12 is a diagram for illustrating a schematic structure of a system according to a second embodiment of the present invention.

FIG. 12 illustrates a schematic structure of a system of the game of "virtual idol fun" according to a second embodiment.

In the game server 10, in addition to the above described database for the game 10a2, segment stories from No. 1 to No. 12 comprising twelve volumes of a beauty idol bringing up story, which constitutes the game of "virtual idol fun", are stored as a software 10a'.

In the segment stories from No. 1 to No. 12, respective segment stories from No. 1 to No. 12 reflecting all options (selection items) included in respective segment stories, respectively, are manufactured as a story and are stored.

For example, respective segment stories No. 1 reflecting the options No. 1 to No. 5 of the hairstyle of the beauty idol in the segment story No. 1, respectively, respective segment stories No. 2 reflecting the options No. 1 to No. 5 of the costume of the beauty idol in the segment story No. 2, respectively, with respect to respective segment stories No.2 reflecting the options No. 1 to No. 5 of the hairstyle of the beauty idol in the segment story No. 2, respectively, respective segment stories No. 3 reflecting the options No. 1 to No. 5 of the making up of the beauty idol in the segment story No. 3, respectively, with respect to respective segment stories No. 3 reflecting the options No. 1 to No. 5 of the hairstyle of the beauty idol in the segment story No. 1 and the options No. 1 to No. 5 of the costume of the beauty idol in the segment story No. 2, respectively, and respective segment stories No.4 reflecting the options No. 1 to No. 5 of the photograph of the entire body of the beauty idol in the segment story No. 4, respectively, . . . or the like are stored in the game server 10 as contents.

Further, a control device S' for executing the game by using these contents is stored in the game server 10.

The control device S' stores the information of the member when the member is admitted in the member managing database 30. Upon executing the game, the control device S uses a record of the member managing database 30 if necessary.

For example, when the member pays the fee to the game provider, the control device S' obtains the credit number of the member from the member managing database 30 and collects a predetermined amount of money from the member's account or the member pays the fee by a web money.

According to the game of "virtual idol fun" of the second embodiment, the beauty idol bringing up story for bringing up the beauty to be the idol is segmented from the game server 10 and they are regularly distributed to the terminals of the members who participate in the game as a segment story.

Then, the members poll their votes (transmit the poll data from the terminals of the members to the game server 10) to the option of the costume or the like of the beauty, which is given to the members in the beauty idol bringing up story. If the option, which one member selects is identical with the option, which the most members select, this one member is given a point. Thus, the members compete for the point each other.

Figure 13:
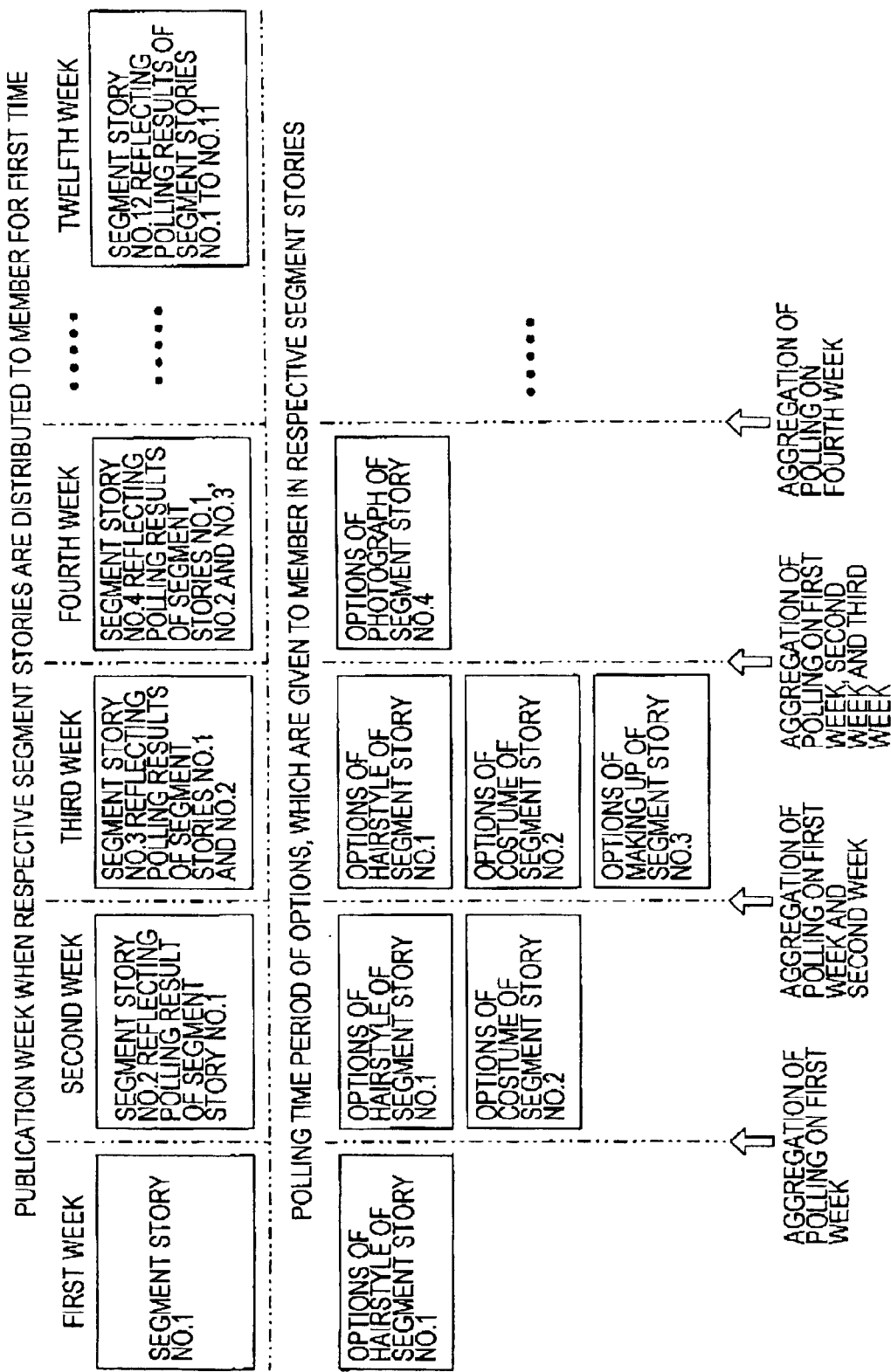
FIG. 13 is a diagram for illustrating time periods of distribution and polling of a segment story according to the second embodiment of the present invention.

As shown in FIG. 13, the segment stories from No. 1 to No. 12 of the twelfth volume comprising twelve volumes of beauty idol bringing up story are distributed from the game provider to the terminals of the members every week from a week when the game starts, namely, the segment story No. 1 is distributed in the first week, the segment story No. 2 is distributed in the second week, the segment story No. 3 is distributed in the third week, . . . , and the segment story No. 12 is distributed in the twelfth week.

In respective segment stories, the selection items including the options are provided to the members. The members select the item from the selection items and poll the votes to the game provider (transmit the poll data to the game server 10).

The member is capable of polling the vote to the given options only once.

The time period of the polling is defined in units of three weeks. The segment stories No. 1 to No. 3, the segment stories No. 4 to No. 6, segment stories No. 7 to No. 9 and segment stories No. 10 to No. 12 are one unit, respectively.

Aggregating methods of the polling of the segment stories No. 1 to No. 3 and the polling performed by the game provider will be explained (refer to FIG. 13).

The aggregation of the polling is carried out for every week by the game server 10 and the polling result of the segment stories No. 1 to No. 3 is decided after three weeks.

Then, the game server 10 reflects the aggregating result for every week on next and after segment stories and distributes the next and after segment stories on which the aggregating result is reflected to the terminals of the members on and after a next week.

For example, the time period for polling the vote to the option of the hairstyle of the segment story No. 1 is three weeks. The accumulated total of the polling is aggregated for every week and the final result is decided after three weeks.

The time period for polling the vote to the option of the costume of the segment story No. 2 is two weeks. The accumulated total of the polling is aggregated for every week and the final result is decided after two weeks.

The time period for polling the vote to the option of the making up of the segment story No. 3 is one week. The accumulated total of the polling is aggregated for every week and the final result is decided after one week.

Then, at the second week, the segment story No. 2 reflecting the option of the hairstyle of the segment story No. 1, to which the most votes are polled, is distributed. Further, at the third week, the segment story No. 3 reflecting the option of the hairstyle of the segment story No. 1, to which the most votes are polled, and the option of the costume of the segment story No. 2, to which the most votes are polled, is distributed.

Thus, if the polling of the member is identical with the polling of the most members across three weeks, that member is provided with the prize.

In the same way, the polling and the aggregation method in units of the segment stories No. 1 to No. 3 are applied in units of the segment stories No. 4 to No. 6, the segment stories No. 7 to No. 9 and the segment stories No. 10 to No. 12, respectively.

Consequently, the processing of a system according to the second embodiment will be explained below.

As shown in FIG. 12, it is assumed that the segment story No. 1 is distributed from the game server 10 to the terminal of the member.

Then, the options of the hairstyle of the virtual idol are given to the member who catches the segment story No. 1 in the segment story No. 1.

For example, a first option of the hairstyle is a bob and a second option of the hairstyle is a longhair cut . . . or the like.

Figure 14:
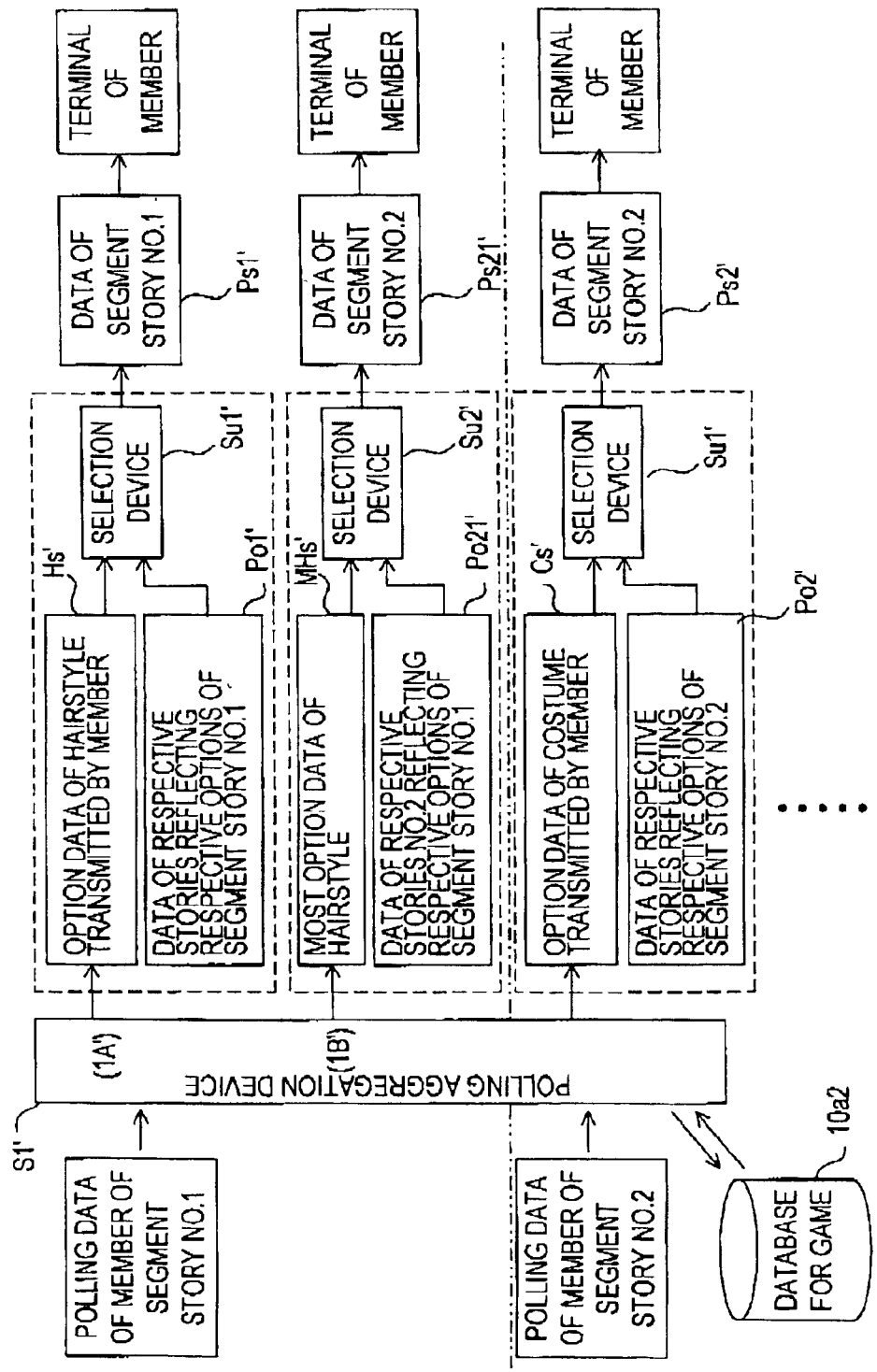
FIG. 14 is a diagram for illustrating a system processing according to the second embodiment of the present invention.

Therefore, the members select the options and transmit the polling data from the terminals of the members to the game server 10, so that they give the members' intentions to the game provider (refer to FIG. 14).

Then, poll aggregating device S1' of the control device S', which is stored in the game server 10, counts the option which the member is selected as a point. For example, in the case that the member selects the option No. 1, the poll aggregating device S1 adds 1 to a parameter N1 representing the number of polling of the option No. 1 as shown in FIG. 5A.

In the case of the data of other options, the poll aggregating device S1' counts the number of polling in the same way.

Alternatively, the poll aggregating device S1' records the option to which the member polls the vote in the database for the game 10a2 as the member's record with the member's identity being a key.

At the same time, as shown by a mark (1A') in FIG. 14, the data Ps1' of the segment story No. 1 reflecting the option of the hairstyle, which is transmitted by the member by using the selection device Su1', is selected from date Po1' of five respective segment stories reflecting respective options of the hairstyle of the segment story No. 1 by means of the data Hs' of the option of the hairstyle, which is transmitted by the member. Then, the selected data Ps1' of the segment story No. 1 is immediately distributed to the terminals of the members from the game server 10.

Accordingly, after polling the vote, the member is capable of enjoying his or her polling result immediately in the segment story No. 1, which he or she is catching.

Upon aggregating the selection items of the segment story No. 1, namely, after one week, two weeks and three weeks from the week when the options are put on view, the poll aggregating device S1 compares the number of polling of respective options, which are counted by a method shown in FIG. 5A.

Then, as shown by a mark (1B') in FIG. 14, the data Ps21' of the segment story No. 2 reflecting the option of the hairstyle achieving the most votes of the members is selected by using the selection device Su1' from the data Po21' of five respective segment story No. 2 reflecting respective options of the hairstyle of the next and after segment stories No. 1 to be distributed in the next week by the data MHs' of the option of the hairstyle achieving the most votes of the members.

In the next week, the game server 10 distributes the segment story No. 2 to be created by the data Ps21' of the segment story No. 2 to the terminals of the members.

The same processing is performed after two weeks and three weeks with respect to the segment story No. 2 and it is performed after three weeks with respect to the segment story No. 3.

Then, upon aggregating the final result after three weeks, the poll aggregating device S1' obtains the options of the hairstyle, the costume and the making up, to which respective members poll the votes, from the database for the game 10a2 and compares them to the option of the hairstyle, the costume and the making up, to which the most members poll the votes.

After that, in the case that the option, to which one member polls the vote, is identical with the option, to which the most members poll the votes, as shown in FIG. 5B, a point is added to a point T of this member.

On the contrary, in the case that the option, to which one member polls the vote, is not identical with the option, to which the most members poll the votes, a point is not given to this member.

The poll aggregating device S1' performs the above described point calculation processing for all members who poll the votes.

Hereinafter, the same processing as that in the segment stories No. 1 to No. 3 is carried out in units of the segment stories No. 4 to No. 6, the segment stories No. 7 to No. 9 and the segment stories No. 10 to No. 12, respectively.

When the game is over and all polling in the segment stories No. 2 to No. 12 is finished, the poll aggregating device S1' compares the total point T of respective members, so that the points of the members are placed in order.

According to the second embodiment realized by such a method, the admission home page, the member dedicated page and the guest page are the same as those in the first embodiment.

Figure 11:
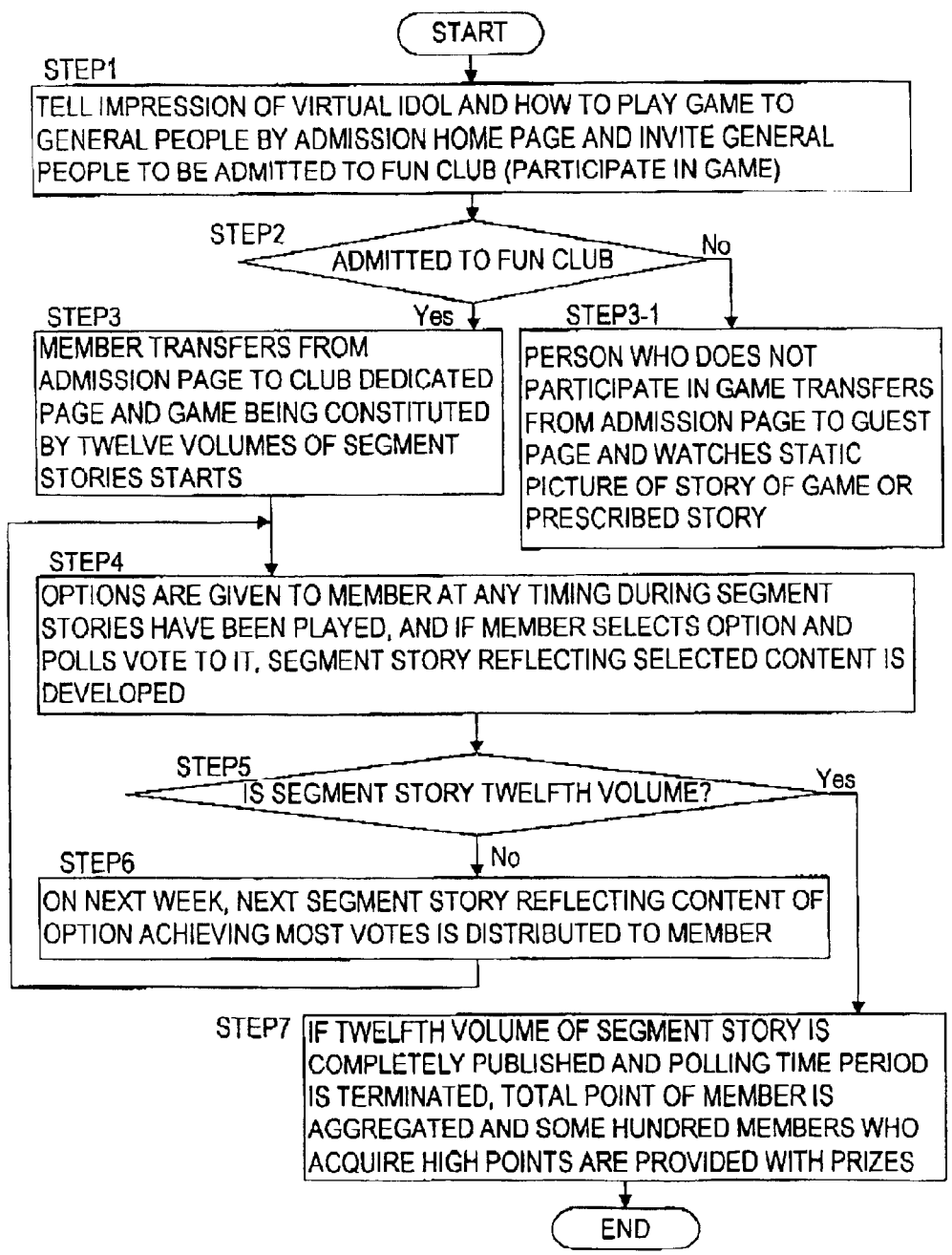
FIG. 11 is a diagram for illustrating progress of a game according to the first embodiment of the present invention.

Alternatively, the specific flow of the game is the same as that shown in FIG. 11 according to the first embodiment. However, the aggregation of the polling is closed for every three weeks in units of the segment stories No. 1 to No. 3, the segment stories No. 4 to No. 6, the segment stories No. 7 to No. 9 and the segment stories No. 10 to No. 12, respectively. Therefore, the game is over in twelve weeks.

Additionally, according to the second embodiment, the aggregation of the polling is set for three weeks. However, it is possible to selectively set other time period such one week, two weeks, four weeks and five weeks or the like.

Alternatively, according to the second embodiment, in the structure of the software, the stories reflecting all options are created in advance and they are stored. However, other structures may be selectively applied. For example, the method by combining exemplified according to the first embodiment and the method for creating a story reflecting all options in advance according to the second embodiment may be combined.

Further, various applications, which are described according to the first embodiment, may be selectively applied also in the second embodiment.

Additionally, according to the above described first and second embodiments, the game is progressed by distributing respective segment stories constituting the game from the game server of the game provider to the terminals of the game participants (members) via the Internet. However, it is also possible to make the game progress by distributing respective segment stories to the game participants by using an interactive television set (bi-directional television set).

The present invention is capable of being applied to other various communication figurations capable of forming a network as described above.

As described above, according to the present invention, it is possible that large number of people can participate in the game.

Alternatively, during the same segment story has been distributed, the segment story having a content of the option, which is selected by the member, is developed, so that it is possible to satisfy the preference of each member.

Additionally, if the next segment story is distributed, the segment story having a content of the option, which is selected by large number of people, is developed, so that the member recognizes the difference of the preference between himself or herself and many other persons. Therefore, the member can have fun, which is not obtained from a conventional game.

Further, depending on the polling result, the game provider provides the prizes to the member, so that the member can get the commercial goods and the point on the web by participating in the game. Therefore, the member can play the game with expecting the prize.

Additionally, after the publication of respective segment stories is terminated, the segment story CD-ROM in a movie format including the segment stories reflecting all options and the unpublished images is sold, so that the member can enjoy fun included in the story of the game and enjoy fun which is not obtained during playing the game with an excellent image quality and an excellent voice quality after the publication of respective segment stories is terminated.

Alternatively, after the game is terminated, the episode CD-ROM including all stories reflecting all options and the unpublished images is sold, so that the member can enjoy all stories by his or her preference as well as the member can enjoy fun, which is not obtained during playing the game, after the game is terminated.

On the other hand, the game provider is capable of distributing the game to large number of people and entertaining large number of people, since large number of people can participate in the game.

Additionally, if the system is set such that the point to be given to the member is increased as the segment story makes progress, the member's will to participate in the game is more increased, so that the game provider is capable of making a larger number of people participate in the game.

Alternatively, the game provider holds the polling for every segment story and provides the prize depending on the polling result. Further, if the game provider accumulates the point till the last polling to provide the prize to the member, the member's will to participate in the game is more increased. Therefore, the game provider is capable of making a larger number of people participate in the game.

Alternatively, in the case that the game provider aggregates the polling for every segment story in plural times, if the game provider sets the odds of the point to be given to the member lower for the later aggregation of the polling by the member, it is possible to remedy injustice in the points of the members, which occurs by the difference in the time periods of the members' polling.

Additionally, if the game provider sells the segment story CD-ROM and the episode CD-ROM, he or she can obtain a chance to make a profit apart from the game as well as can have a synergy effect to be directly combined to a character business.

Accordingly, according to the present invention, it is possible to obtain a new member participation type game via a network, which is beneficial both for the member and the game provider, respectively.

Alternatively, according to the above described embodiment, the game of the virtual idol fun is exemplified. However, it is needless to say that a network participation type game system and a recording medium capable of being read by a computer, in which a program of the system is recorded, according to the present invention are efficiently applied to other various games.

In the next place, with reference to FIGS. 15 to 20, a third embodiment to which the present invention is applied will be described below. Alternatively, the present embodiment is different from the above described second embodiment in that the processing of the point and the adding method of the point are changed. As hardware, a common one to the above described first and second embodiments may be used, so that a detailed explanation thereof is herein omitted.

Figure 15:
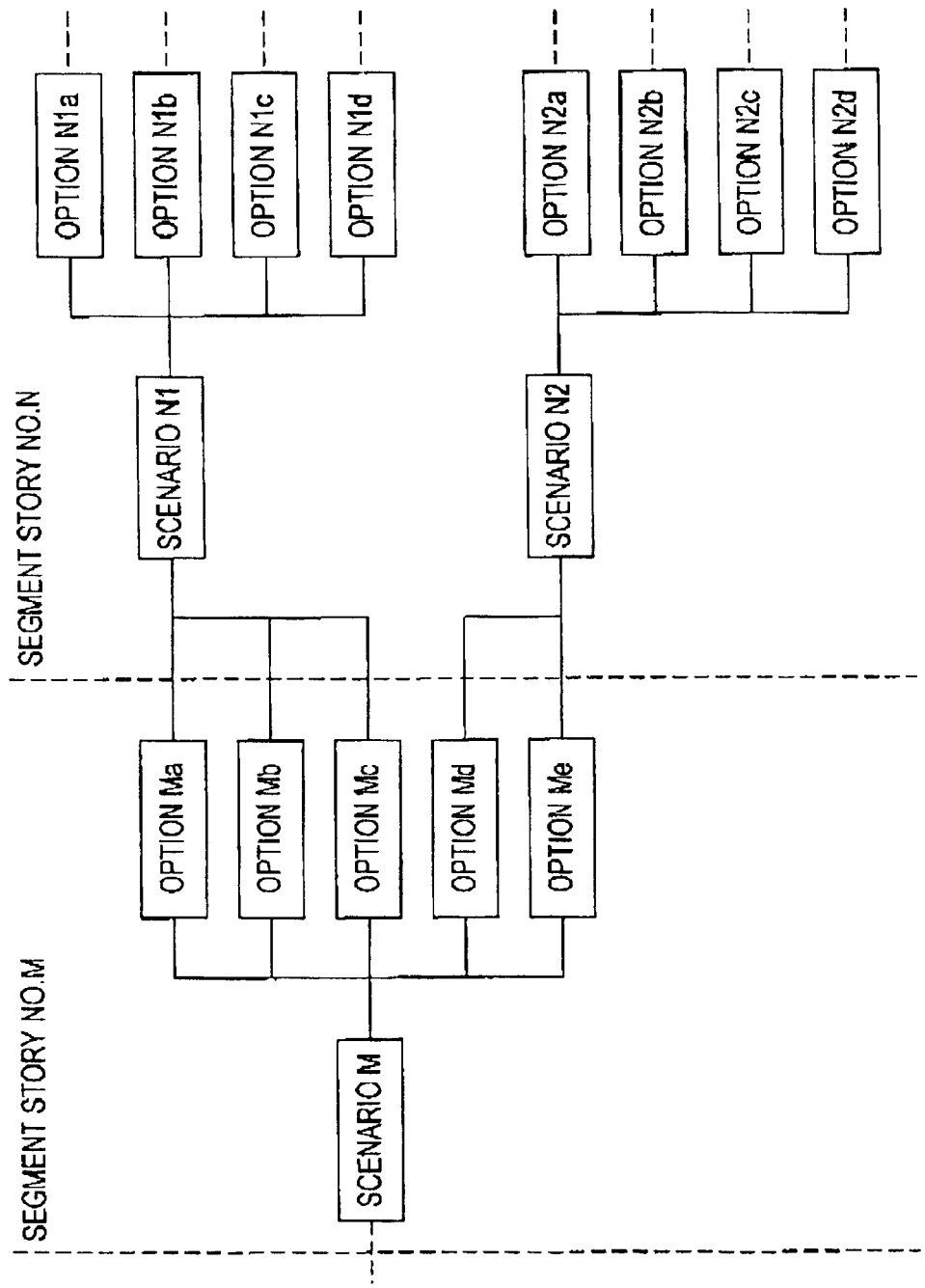
FIG. 15 is a diagram for illustrating a mutual relation of a segment story according to a third embodiment of the present invention.

According to the present embodiment, as same as the above described first and second embodiments, the story is updated every week. As a relation between Mth week and the next Nth week is illustrated in FIG. 15, the segment story that is distributed each week includes a scenario to be commonly distributed to all members and a plurality of options prepared for this scenario. The member is provided with a voting right only once with respect to the options for each week.

One scenario or plural scenarios are prepared for each week. With reference to the week when plural scenarios are prepared, it is decided which scenario should be distributed on the basis of the polling result of the members with respect to the options at the last week. According to an example shown in FIG. 15, plural scenarios N1 and N2 are prepared at Nth week. In the case that any one of the options Ma to Mc is selected among the options Ma to Me, which are prepared for the scenario M at the last week, the scenario N1 is distributed and in the case that the option Md or Me is selected, the scenario N2 is distributed, respectively. For each of the scenarios N1 and N2, the options Na1 to N1d and N2a to N2d are further prepared, respectively. The scenario to be distributed at the next week is changeable depending on which option is selected by the polling among these options. Then, also in the present invention, a content of the segment story is changed step by step depending on the selection result for the polling of the member.

Figure 16:
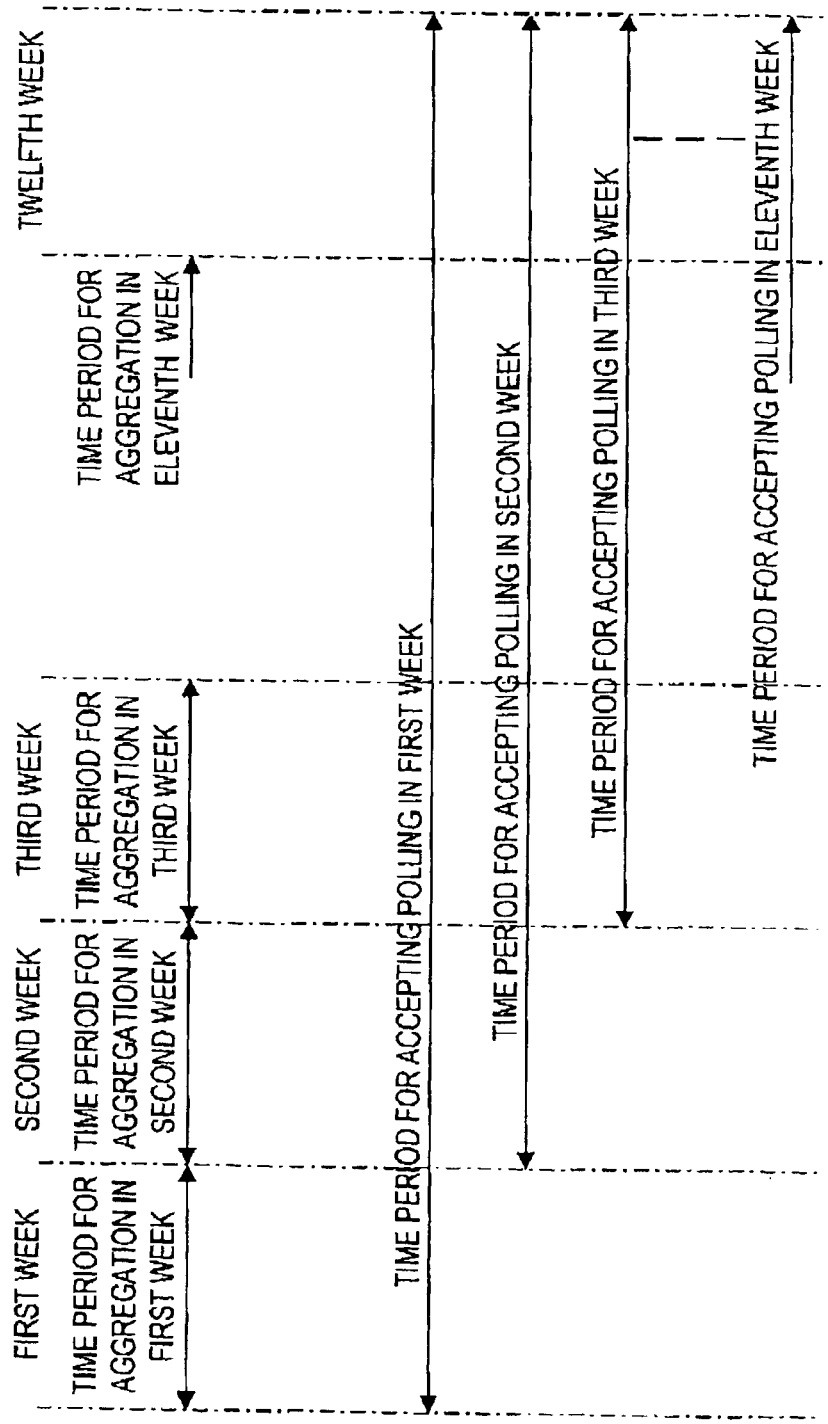
FIG. 16 is a diagram for illustrating a relation between a time period for aggregating polling from a member and a time period for accepting the polling from a member according to a third embodiment of the present invention.

FIG. 16 is a diagram for illustrating a relation between an aggregating time period and an accepting time period for the polling according to a third embodiment of the present invention. In this case, the aggregating time period means a time period for accepting the polling to decide a scenario to be distributed at the next week. The accepting time period means a time period for adding a point to the polling of the member. According to the above described first and second embodiments, the aggregating time period is set as three weeks from the week when the story is published. On the contrary, as clearly shown in FIG. 16, according to the third embodiment, the aggregating polling time period of each week is limited in the present week. Therefore, the time when the polling result of each week is decided quickens, so that the story on the last and before weeks is not retrospectively changed by the influence of the polling result on and after the publication week.

On the other hand, according to the first and second embodiments, the member who polls the vote to the option achieving the most votes is provided with a point. However, according to the present invention, after each scenario is published, the accepting time period is provided till the last week (as an example, the twelfth week). If the member polls the vote within this accepting time period, a point depending on that polling content is provided to the member. Further, how to give the point is not related to the points of respective options. For example, as shown in FIG. 17, with respect to the options Ma to Me, the detailed particulars of the items which the virtual idol wears, the name of the virtual idol and the back ground or the like as well as the additional point for every option are set in advance. Then, in the case that the member polls the vote to any one of the options, the member is provided with the additional point in association with this option to which the member polls the vote. Such data is capable of being recorded in advance, for example, in the database for the game shown in FIG. 12. Among the data for every option, which are created and recorded in this way, for example, the item is exhibited as the option.

Figure 18A:
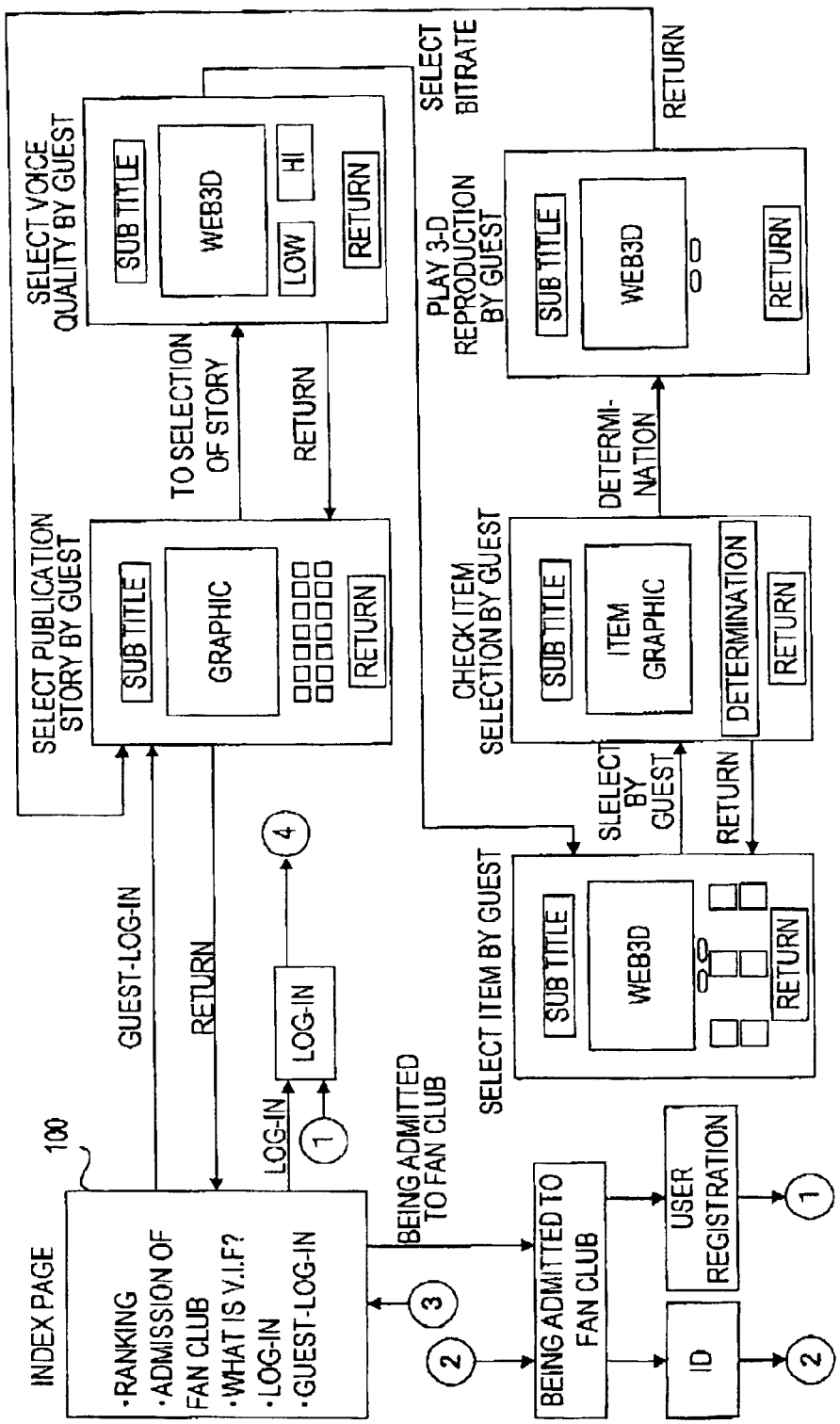
FIGS. 18A and 18B are diagrams for illustrating a summary of a progress procedure of a game according to the third embodiment of the present invention by a picture on a terminal.
Figure 18B:
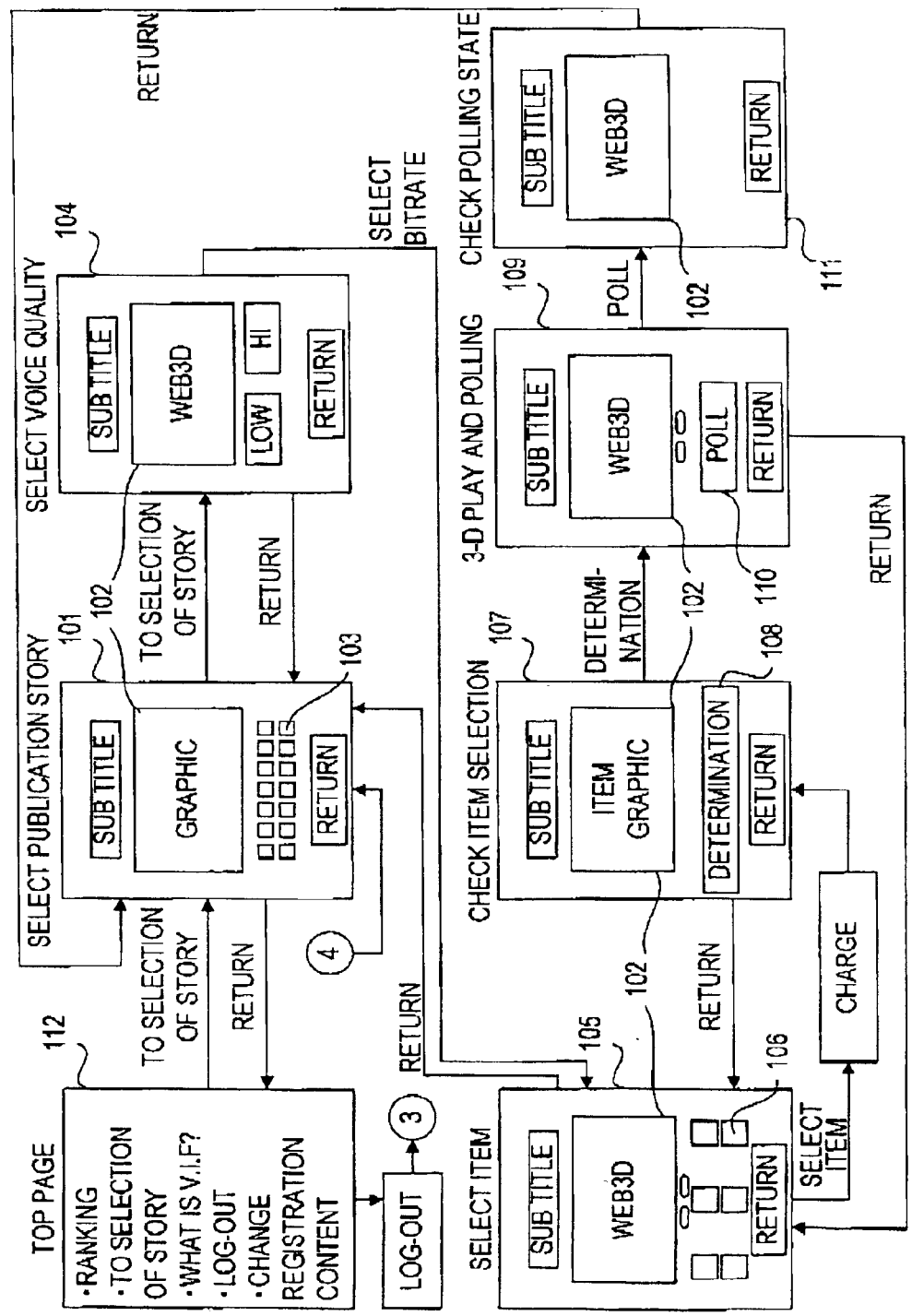
Figure 19:
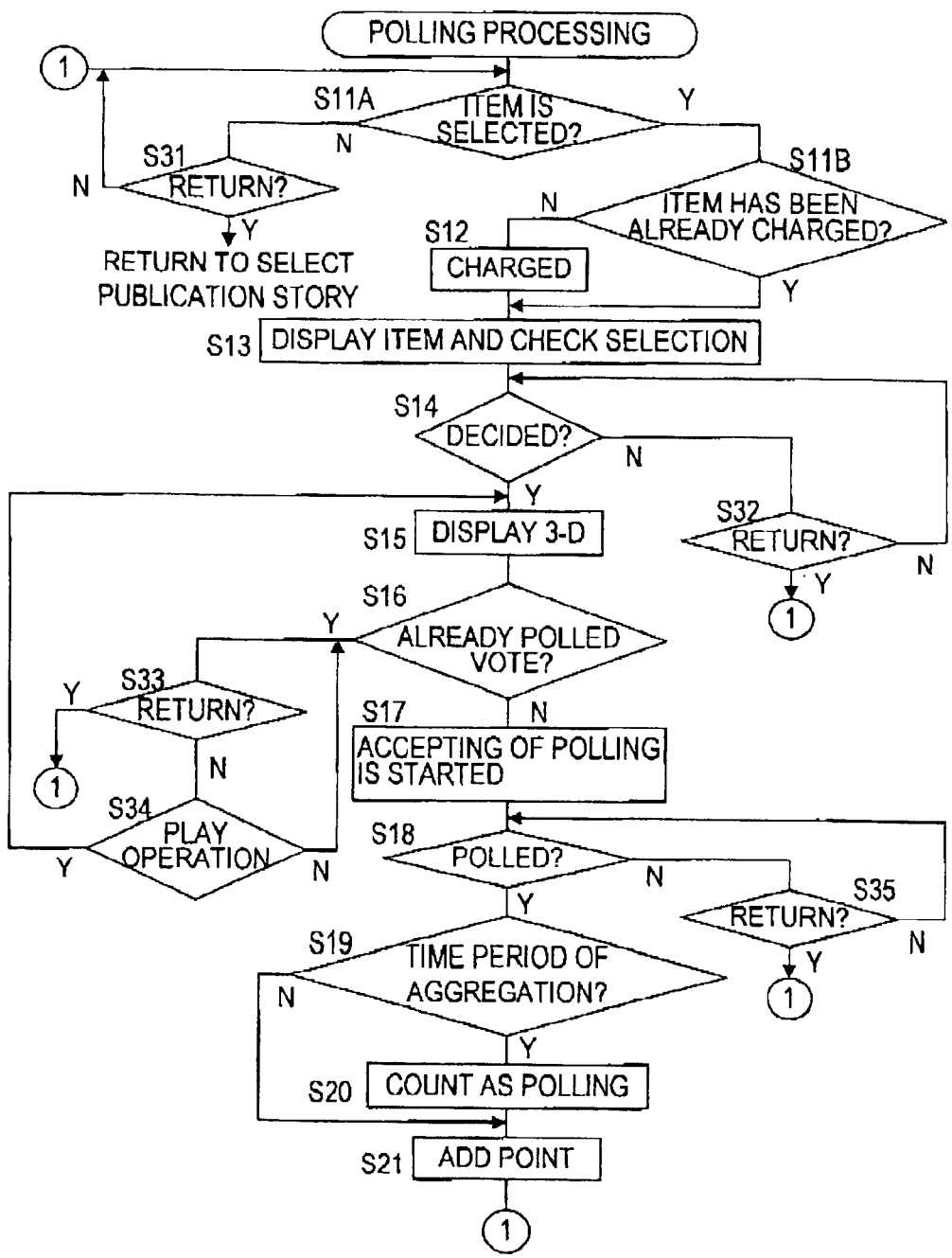
FIG. 19 is a flow chart for illustrating a processing procedure to be carried out by a game server according to the third embodiment of the present invention.
Figure 20:
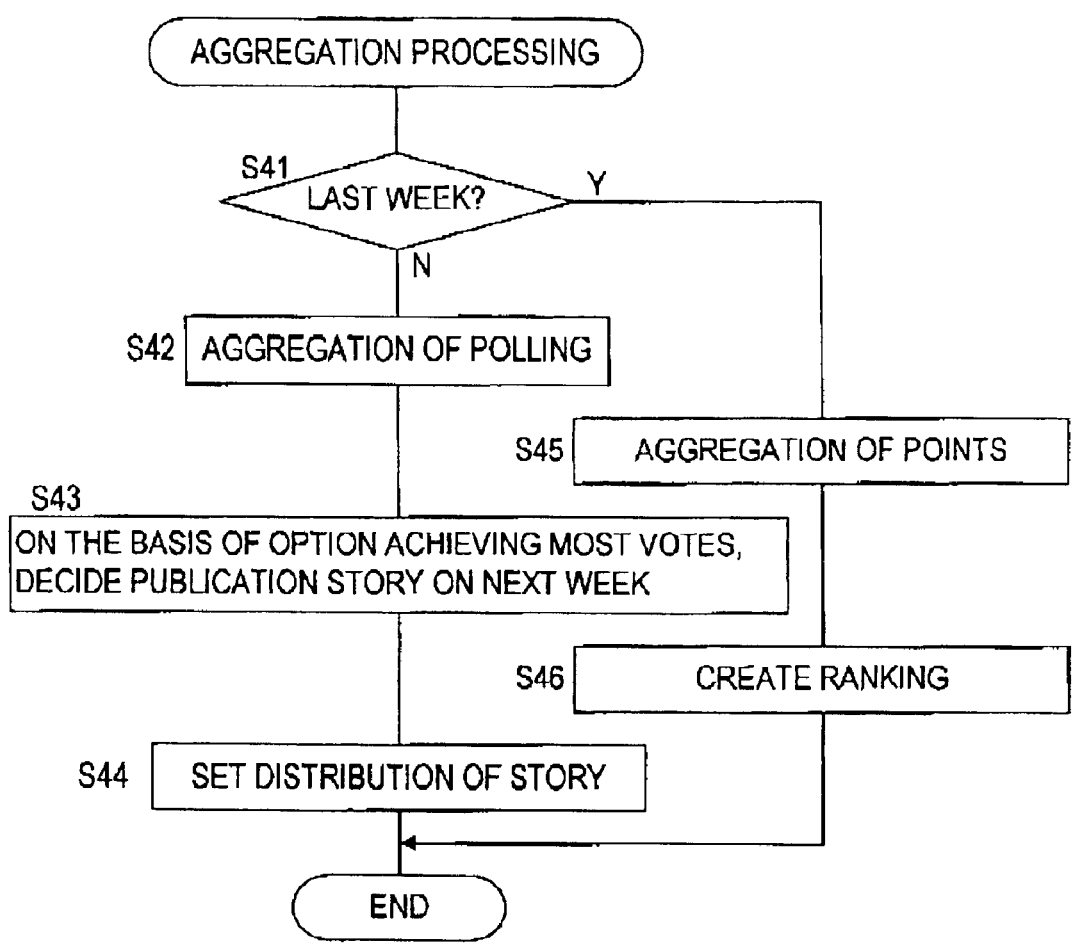
FIG. 20 is a flow chart for illustrating other processing procedure to be carried out by a game server according to the third embodiment of the present invention.

In the next place, with reference to FIGS. 18 to 20, the processing order of the polling by the member and the addition of the point will be explained below. FIGS. 18A and 18B illustrate a progress procedure of a game according to the third embodiment by a picture displayed on a terminal of a user (a member or a nonmember). FIG. 19 and FIG. 20 are flow charts for illustrating a processing procedure to be carried out by a controller of a game server 10 (S' in FIG. 12) in connection with the progress of this game.

According to the third embodiment, if the user has access to the game server 10, a predetermined index page 100 is displayed on a monitor of the terminal, which is used by the user. The members can participate in the game from the index page 100 by performing a predetermined log-in operation and the nonmembers can participate in the game by performing a guest-log-in operation, respectively.

A publication story selection picture 101 is displayed on the terminal of the member, who performs the log-in operation. On the publication story selection picture 101, a main window 102 for displaying a predetermined static picture and a moving image and a plurality of selection buttons 103 . . . 103 are displayed. The selection button 103 is prepared for selecting a story, which the user desires to catch. On the main window 102 of the publication story selection picture 101, a static image picture or a moving image (a dynamic picture) is displayed to transmit the image of the virtual idol.

Selecting any one of the selection buttons 103 by a predetermined operation for the terminal (typically, a pointing device is operated to conform to the selection button 103 and a predetermined selection operation is performed in this state), the member is capable of arbitrarily selecting the story published on this week or before this week.

If the member selects the story, a voice quality selection page 104 is displayed. The member can select any one of a high tone quality and a low tone quality on this page 104. If the tone quality is selected, an item selection picture 105 is displayed. On the item selection picture 105, item selection buttons 106 . . . 106 are displayed as well as the main window 102. If the displayed picture is switched to the item selection picture 105, the moving image on the basis of the scenario prepared for the segment story, which is currently selected, is displayed on the main window 102 for a predetermined time (for example, one minute). Alternatively, the scenario to be used here is selected on the basis of the polling result before the week when the story is selected. For example, taking a segment story No. M shown in FIG. 15 as an example, a scenario M will be used.

By the item selection buttons 106 on the item selection picture 105, the members can select the options prepared for the segment story, which is currently selected. If the display of the moving image is terminated, the game server 10 starts the polling processing shown in FIG. 19.

According to this processing, at first, it is judged which item (refer to FIG. 17) is selected by the member with using the item selection button 106 (step S11A). When one option is selected, it is judged that this selected item has been already charged or not (step S11B). Then, if it is not charged, in association with the selection of the item, the member is charged (step 12). With respect to each item, the same amount may be charged or the different amount may be charged depending on the items. The item, which has been charged once, is capable of being caught without being charged again, so that the judging result is positive in the step S11B, the step 12 will be skipped.

After that, an item selection checking picture 107 shown in FIG. 18 is displayed on the terminal of the member so as to urge the member to check the content of the selection (step S13). A static image showing the selected item is displayed on a main window 102 on the item selection checking picture 107 as well as a decision button 108 is displayed to decide its selection on the item selection checking picture 107.

If the member selects the selection button 108 and clicks it, the information indicating that the selection of the item displayed on the main window 102 is checked is transmitted from the terminal of the member to the game server 10. Therefore, the game server 10 judges that the selection of the item is decided or checked (step S14). Then, the game server 10 displays a three-dimensional image for expressing an appearance that the virtual idol puts on the selected item or the like on the main window 102 on a polling picture 109 (step S15). The member is capable of checking that he or she should poll the vote to the item selected by himself or herself or not by watching this three-dimensional image.

If the display of the three-dimensional image is terminated, the game server 10 judges whether that member has already polled the vote to the currently selected segment story or not (step S16 in FIG. 19). In other words, according to the present embodiment, with respect to each segment story, the members are provided with a voting right only once, so that the information for judging whether respective members have polled the votes or not is recorded in the database 10a2 and multiple voting is prevented with reference to this information. When the member has not polled the vote yet, the game server 10 allows a polling button 110 to appear on the picture 109 in FIG. 18 so that the accepting of the polling is started (step S17). When the member selects the polling button 110 and clicks it, it is possible to carry out the polling.

When the operation of the polling is performed, the information indicating the content of the polling is transmitted from the terminal of the member to the server 10. If this information is transmitted, the controller S' makes an affirmative decision at the step S18 and then judges whether or not the aggregating time period with respect to the voted item (option) has been lapsed (step S19). Then, in the case that the member selects the item with respect to the segment story in this week and votes to it, the judging result in the step 19 is affirmative and the number of votes of the voted item is counted up (step S20). On the other hand, if the present time is not the aggregating time period, then the step S20 is skipped. In other words, in the case that the member polls the vote to the segment stories in the last week and before, the aggregating time period expires, so that the number of votes of the voted item is not counted up. After that, the processing proceeds to step S21 and the additional point in association with the option, to which the member polls the vote, is provided to that member as a point. After the point is provided, the processing returns to the step S11A. In this case, as shown in FIG. 18, a polling state checking picture 111 is displayed and the three-dimensional image in association with the voting behavior is displayed on the main window 102. If the display of the three dimensional image is terminated, the picture returns to the publication story selection picture 101.

In this way, the member can select any item from a plurality of items, which are prepared for the stories in respective weeks, and poll the vote to it only once. However, it is possible to repeat the selection of the item and catching of the image in connection with this selection in many times by charging once for each item.

Alternatively, on respective pictures 101 to 102 shown in FIG. 18, a button described "return" is prepared, respectively. If the member selects this button and clicks it (hereinafter, this operation is referred to as a return operation), it is possible to return the selection order of the item to a predetermined position. For example, in the case that the return operation is performed on the publication story selection picture 101, the processing is capable of returning to a top page 112 of the Web site. In the case that the return operation is performed on the voice quality selection page 104, the processing is capable of returning to the publication story selection picture 101. In the case that the return operation is performed on the item selection picture 105, the processing is capable of returning to the publication story selection picture 101 (corresponding to a case that the judging result is positive in the step S11A □" S31 in FIG. 19). In the case that the return operation is performed on the item selection checking picture 107, the processing is capable of returning to the item selection picture 105 (the step S14 □" S32 □" S11A in FIG. 19). Also in the case that the return operation is performed on the polling picture 109, the processing is capable of returning to the item selection picture 105 (the step S18 □" S35 □" S11A in FIG. 19). At the step S16 in FIG. 19, in the case that it is judged that the member has already polled the vote, the processing proceeds to step S33 and it is judged whether the return operation is performed on the polling picture 109 or not. Then, if the return operation is not performed, it is judged whether the return operation of the three-dimensional image is performed or not (step S4). Then, this operation is performed, the processing returns to the step S33. Therefore, even after polling the vote to a particular segment story, the member is capable of enjoying the three-dimensional image, which is prepared for respective items on the same week.

On the other hand, in the case that the nonmember performs the guest log-in on the index page 100 shown in FIG. 18, according to substantially same order as the above described order, it is possible to play the game of "virtual idol fun" within a predetermine range as a publication range for a guest. The guest log-in is mainly different from the member's log-in in that the options which are prepared in respective stories in each week are selected only as a static picture and the polling is not possible. The explanation of the detailed particulars of the order is omitted.

When the publication week of the segment story is terminated, the game server 10 performs the aggregation processing shown in FIG. 20. According to this processing, at first, it is judged whether the story arrives at the last week (the twelfth week) or not (step S41). Then, the present week is not the last week, the polling result in this week is aggregated (step S42). After that, on the basis of the option achieving the most votes, the story to be published next week is decided (step S43). Consequently, the decided story is set to be distributed next week (step S44) and after that, the processing is terminated. On the other hand, it is judged that the present week is the last week in the step S41, the points of respective members are aggregated (step S45) and creates this ranking (step S46). After that, the processing is terminated. The created ranking is published, for example, via the Internet or it is used as a standard upon giving any privilege to the member.

According to the above described third embodiment, the selection of the item is only permitted to the member. However, the present invention is not limited to a system having an operation manner for membership only but the present invention may be applied to a system such that the selection of the option is widely released to the general users. Additionally, the accounting object action is set to the clicking operation of the polling button 110 in FIG. 18.

The present invention is not limited to the above described embodiments but it may be realized in various manners.

As described above in detail, a large number of people can participate in the game by a network participation type game system and a recording medium capable of being read by a computer, in which a program of the system is recorded according to the present invention.

Alternatively, since the segment story is developed with a content of the selection item, which is selected by the member, it is possible to satisfy preferences of respective members, respectively.

Alternatively, if the system is set such that the segment story is developed with a content of the selection item, which is selected by many members, when the next segment story is distributed, the member recognizes the difference of the preference between himself or herself and many other persons. Therefore, the member can have fun, which is not obtained from a conventional game.

Additionally, by using a recording medium including respective segment stories reflecting all selection items (a segment story CD-ROM) and a recording medium including all stories reflecting all selection items (an episode CD-RORM), the member can enjoy all stories by his or her preference after the game is over.

Alternatively, the data is recorded in the recording medium including respective segment stories (the segment story CD-ROM) in a movie format, so that the member can enjoy the story an excellent with an excellent image quality and voice quality.

On one hand, the game provider is capable of distributing the game to large number of people and entertaining large number of people, since large number of people can participate in the game.

Additionally, if the system is set such that the point to be given to the member is increased as the segment story makes progress, the member's will to participate in the game is more increased, so that the game provider is capable of making a larger number of people participate in the game.

Alternatively, in the case that the game provider aggregates the polling for every segment story in plural times, if the game provider sets the odds of the point to be given to the member lower for the later aggregation of the polling by the member, it is possible to remedy injustice in the points of the members, which occurs by the difference in the time periods of the members' polling.

Alternatively, if the game provider opens a picture and a voice created by combining or assembling the picture and the voice, which are selected from respective segment stories, to the public so that the public can freely catch this picture and this voice in a Web site, it becomes possible to make more people participate in the game by its attraction.

Additionally, if the pay selection buttons are provided on the member dedicated page for providing the game to the member, the member transmits the member's intention to the game provider by selecting the pay selection and a predetermined amount of money is charged to the member, a new game charge collecting method is obtained.

Accordingly, according to a network participation type game system and a recording medium capable of being read by a computer, in which a program of the system of the present invention, it is possible to obtain a new member participation type game via a network, which is beneficial both for the member and the game provider, respectively.

What is claimed is:

1. A network participation type game system for distributing a game from a game provider to a member via a network, said game system comprising:
    a device for sequentially and regularly distributing a segment story from the game provider to the member, said segment story being prepared by segmenting a story constituting the game, said segment story being provided on a member dedicated page provided with a plurality of selection buttons, and the selection buttons being capable of selecting a changeable manner of a character or the like in the segment story; and
    a device for transmitting member's intention to the game provider in accordance with selection of the selection buttons by the member; wherein:
        the game provider is allowed to change manners of the character or the like of next and after segment stories with reflecting the transmitted member's intention;
        the member's intention to be reflected on the next and after segment stories corresponds to the intention of the most members; and
        when the member's intention is identical with the intention of the most members, a point is given to the member and the members compete for their points.

2. The network participation type game system according to claim 1, wherein the members' intentions are aggregated with being accumulated in plural times for each segment story, and odds for the point to be given to the member are lower for the later aggregation of the members' intentions.

3. The network participation type game system according to claim 1, wherein the point is different between the segment stones.

4. The network participation type game system according to claim 3, wherein the point to be given to the member is set to be higher in a later segment story than in a former segment story.

5. The network participation type game system according to claim 1, wherein the network participation type game system creates a picture and a voice by combining or assembling pictures and voices selected from the respective segment stories, and provides said picture and voice so as to be published to thereby be freely caught on a Web site.

6. A recording medium readable by a computer in which a program of a network participation type game system for distributing a game from a game provider to a member via a network is recorded, said program being configured to allow the computer system to serve as:
    a device for sequentially and regularly distributing a segment story from the game provider to the member, said segment story being prepared by segmenting a story constituting the game, said segment story being provided on a member dedicated page provided with a plurality of selection buttons, and the selection buttons being capable of selecting a changeable manner of a character or the like in the segment story; and
    a device for transmitting members intention to the game provider in accordance with selection of the selection buttons by the member, wherein:
        the game provider is allowed to change manners of the character or the like of next and after segment stories with reflecting the transmitted member's intention;
        the member's intention to be reflected on the next and after segment stories comprises the intention of the most members; and
        when the member's intention is identical with the intention of the most members, a point is given to the member and the members compete for their points.

7. The recording medium according to claim 6, wherein the members' intentions are aggregated with being accumulated in plural times for each segment story, and odds for the point to be given to the member are lower for the later aggregation of the members' intentions.

8. The recording medium according to claim 6, wherein the point is different between the segment stories.

9. The recording medium according to claim 8, wherein the point to be given to the member is set to be higher in a later segment story than in a former segment story.

10. The recording medium according to claim 6, wherein the network participation type game system creates a picture and a voice by combining or assembling pictures and voices selected from the respective segment stories, and provides said picture and voice so as to be published to thereby be freely caught on a Web site.

11. A network participation type game system comprising a game server and a terminal of a user, said game server being connected with the terminal via a predetermined network and a game being advanced through bi-directional transmission of information, wherein:

the game server sequentially and regularly distributes play information to the terminal to play, on the terminal, a segment story constituted so as to be recognized by the user as a portion of a series of stories of the game and so as to give to the user an opportunity to select any option from a plurality of options;

the terminal transmits selection information for specifying which option the user selects among said plurality of options, which are prepared for the segment story, to the game server;

the game server changes a content of other segment story to be distributed later than a specified segment story on the basis of selection results of respective users with respect to the options, which are prepared for the specified segment story;

the game server decides a content of a segment story to be distributed as the latest segment story in a next publication unit time period on the basis of the selection information, which is accepted with respect to a present segment story, until the publication unit time period with respect to the present segment story passes over; and the game server accepts the selection information relevant to the same segment story across a predetermined accepting time period even after the publication unit time period with respect to the latest segment story passes over and with respect to at least the selection information, which are accepted during the accepting time period, the game server gives points in association with content of the selection information to the user.

12. The network participation type game system according to claim 11, wherein the game server selects one segment story as the other segment story from a plurality of segment story candidates, which are different each other and are prepared in advance, on the basis of the selection information, and distributes the play information associated with this selected segment story, so that the game server changes the content of the other segment story.

13. The network participation type game system according to claim 11, wherein:

the game server tentatively closes accepting of the selection information with respect to the options, which are associated with the present segment story, at a time when the publication unit time period with respect to the present segment story passes over;

the game server supposes a content of the segment story to be distributed as a latest segment story during a next publication unit time period on the basis of the selection information until the publication unit time period with respect to the present segment story, while accepting the selection information with respect to the same segment story across a predetermined time period even after this publication unit time period passes over; and the game server decides a content of the supposed segment story with reflecting the selection information, which is accepted during said predetermined time period.

14. A network participation type game system comprising a game server and a terminal of a user, said game server being connected with the terminal via a predetermined network and a game being advanced through bi-directional transmission of information, wherein:

the game server sequentially and regularly distributes play information to the terminal to play, on the terminal, a segment story constituted so as to be recognized by the user as a portion of a series of stories of the game and so as to give to the user an opportunity to select any option from a plurality of options;

the terminal transmits selection information for specifying which option the user selects among said plurality of options, which are prepared for the segment story, to the game server;

the game server changes a content of other segment story to be distributed later than a specified segment story on the basis of selection results of respective users with respect to the options, which are prepared for the specified segment story; the game server specifies a selected option from the selection information transmitted by the terminal to generate an accounting information corresponding to the selected option; and wherein the game server generates the accounting information of the same amount of money for each of the options prepared for the same segment stories, and gives points, which are differentiated in accordance with the selected option to the user.

15. A program encoded as an executable program on a computer readable medium for a server, which is used in a network participation type game system for connecting a game server with a terminal of a user via a predetermined network and advancing a game through bi-directional transmission of information; said program being configured to allow the game server to perform processing of:

sequentially and regularly distributing play information to the terminal to play on the terminal a segment story constituted so as to be recognized by the user as a portion of a series of stories of the game and so as to give an opportunity to select any option from a plurality of options to the user;

obtaining selection information for specifying which option the user selects among said plurality of options, which are prepared for the segment story, to the game server; and changing a content of other segment story to be distributed later than a specified segment story on the basis of selection results of respective users with respect to the options, which are prepared for the specified segment story, wherein:

the program is structured so as to make the game server perform processing for deciding a content of a segment story to be distributed as the latest segment story in a next publication unit time period on the basis of the selection information, which is accepted with respect to a present segment story, until the publication unit time period with respect to the latest segment story passes over; and the program is structured so as to make the game server perform processing for:

accepting the selection information relevant to the same segment story across a predetermined accepting time period even after the publication unit time period with respect to the latest segment story passes over and with respect to at least the selection information, which are accepted during the accepting time period; and giving points in association with content of the selection information to the user.

16. The program according to claim 15, wherein the program is structured so as to make the game server perform processing for:

selecting one segment story as the other segment story from a plurality of segment story candidates, which are different each other and are prepared in advance, on the basis of the selection information; and distributing the play information associated with this selected segment story.

17. The program according to claim 15, wherein the program is structured so as to make the game server perform processing for:

tentatively closing accepting of the selection information with respect to the options, which are associated with the present segment story, at a time when the publication unit time period with respect to the present segment story passes over;

supposing a content of the segment story to be distributed as a latest segment story during a next publication unit time period on the basis of the selection information until the publication unit time period with respect to the present segment story, while accepting the selection information with respect to the same segment story across a predetermined time period even after this publication unit time period passes over; and deciding a content of the supposed segment story with reflecting the selection information, which is accepted during said predetermined time period.

18. A program encoded as an executable program on a computer readable medium for a server, which is used in a network participation type game system for connecting a game server with a terminal of a user via a predetermined network and advancing a game through bi-directional transmission of information; said program being configured to allow the game server to perform processing of:

sequentially and regularly distributing play information to the terminal to play on the terminal a segment story constituted so as to be recognized by the user as a portion of a series of stories of the game and so as to give an opportunity to select any option from a plurality of options to the user;

obtaining selection information for specifying which option the user selects among said plurality of options, which are prepared for the segment story, to the game server; and changing a content of other segment story to be distributed later than a specified segment story on the basis of selection results of respective users with respect to the options, which are prepared for the specified segment story, wherein:

the program is structured so as to make the game server perform processing for specifying a selected option from the selection information transmitted by the terminal to generate an accounting information corresponding to the selected option; and the program is structured so as to make the game server perform processing for:

generating the accounting information of the same amount of money for each of the options prepared for the same segment stories; and giving points, which are differentiated in accordance with the selected option to the user.

* * * * *